(12) United States Patent
Raveendran et al.

(10) Patent No.: US 12,279,176 B2
(45) Date of Patent: Apr. 15, 2025

(54) BARRIER DETECTION TO AID CONTACT TRACING

(71) Applicant: QUALCOMM Incorporated, San Diego, CA (US)

(72) Inventors: Vidhur Raveendran, Del Mar, CA (US); Iaith Madain, San Diego, CA (US); Xiaoxin Zhang, Sunnyvale, CA (US); Ashok Bhatia, San Diego, CA (US); Vijayalakshmi Raveendran, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 714 days.

(21) Appl. No.: 17/462,168

(22) Filed: Aug. 31, 2021

(65) Prior Publication Data

US 2022/0078575 A1 Mar. 10, 2022

Related U.S. Application Data

(60) Provisional application No. 63/076,295, filed on Sep. 9, 2020.

(51) Int. Cl.
*H04W 4/021* (2018.01)
*G01S 11/06* (2006.01)
(Continued)

(52) U.S. Cl.
CPC ............ *H04W 4/021* (2013.01); *G01S 11/06* (2013.01); *H04W 4/023* (2013.01); *H04W 4/029* (2018.02)

(58) Field of Classification Search
CPC ..... H04W 4/021; H04W 4/023; H04W 4/029; H04W 4/80; H04W 64/00; H04W 4/02;
(Continued)

(56) References Cited

U.S. PATENT DOCUMENTS 9,476,966 B2 10/2016 Sridhara et al.
2015/0126213 A1* 5/2015 Fayssal ................. H04W 4/021
455/456.1
(Continued)

FOREIGN PATENT DOCUMENTS

WO 2005062066 A2 7/2005
WO 2019036578 A1 2/2019

OTHER PUBLICATIONS

International Search Report and Written Opinion—PCT/US2021/048584—ISA/EPO—Dec. 14, 2021.

*Primary Examiner* — Alison Slater
*Assistant Examiner* — Jing Gao
(74) *Attorney, Agent, or Firm* — Thien T. Nguyen

(57) ABSTRACT

Techniques are provided for utilizing wireless devices for contact tracing, and more specifically for detecting a barrier between devices to enhance contact tracing applications. An example method for detecting a barrier between a first device and a second device includes determining, by the first device, a first range measurement with respect to the second device using a first positioning technique determining, by the first device, a second range measurement with respect to the second device using a second positioning technique that is different from the first positioning technique, and detecting the barrier between the first device and the second device based on the first range measurement and the second range measurement.

47 Claims, 22 Drawing Sheets

(51) Int. Cl.
*H04W 4/02* (2018.01)
*H04W 4/029* (2018.01)

(58) Field of Classification Search
CPC ....... H04W 4/33; H04W 4/025; H04W 12/63;
G01S 11/06; G01S 5/0268; G01S 13/765;
G01S 2205/01; G01S 11/14; G01S 17/89;
G01S 17/08; G01S 7/497; G01S 7/4865;
G01S 7/4816; G01S 7/484; G01S 7/4815;
G01S 7/487; G01S 5/021; G01S 7/4814;
G01S 17/48; G01S 5/0284; G01S 15/08;
G01S 17/06; G01S 13/878; G01S 17/18;
G01S 5/02; G01S 17/04; G01S 19/05;
G01S 7/415; G01S 13/84; G01S 7/4808;
G01S 13/08; G01S 19/42; G01S 17/46;
G01S 13/56; G01S 13/89; G01S 2205/02;
G01S 5/0036; G01S 5/0257; G01S 15/89;
G01S 19/17; G01S 5/0027; G01S 5/0054;
H04L 67/52; H04L 67/535
See application file for complete search history.

(56) References Cited

U.S. PATENT DOCUMENTS

| | | |
|---|---|---|
| 2018/0199306 A1 | 7/2018 | Edge et al. |
| 2018/0234820 A1* | 8/2018 | Åström .................. H04W 4/33 |
| 2019/0250640 A1 | 8/2019 | O'Flaherty et al. |
| 2020/0025911 A1* | 1/2020 | Rappaport ............... H01Q 3/26 |
| 2021/0393129 A1* | 12/2021 | Clevenger ............ H04L 9/0861 |
| 2023/0354261 A1 | 11/2023 | Zhang et al. |

* cited by examiner

BARRIER DETECTION TO AID CONTACT TRACING

CROSS-REFERENCE TO RELATED APPLICATIONS

This application claims the benefit of U.S. Provisional Application No. 63/076,295, filed Sep. 9, 2020, entitled "BARRIER DETECTION TO AID CONTACT TRACING," which is assigned to the assignee hereof, and the entire contents of which are hereby incorporated by reference for all purposes.

BACKGROUND

Contact tracing is a technique for identifying and monitoring individuals who may have had contact with an infectious person and may be implemented as a means of controlling the spread of a communicable disease. Wireless communication systems have been used to assist governments and private organizations to implement contact tracing on a large scale. For example, mobile devices such as smart phones, smart watches, tablets, and other such user equipment may be used to determine location histories of users as well as to inform a user that they may have been exposed to a communicable disease so they may monitor their health for signs and symptoms of the disease. Such location based contact tracing techniques, however, may prompt privacy concerns for some users which may inhibit adoption of the technology. Further, the correlation of location data to infection probabilities may have substantial variation due to environmental and other factors. There is a need to improve the effectiveness of mobile devices for contact tracing applications.

SUMMARY

An example method for detecting a barrier between a first device and a second device according to the disclosure includes determining, by the first device, a first range measurement with respect to the second device using a first positioning technique determining, by the first device, a second range measurement with respect to the second device using a second positioning technique that is different from the first positioning technique, and detecting the barrier between the first device and the second device based on the first range measurement and the second range measurement.

Implementations of such a method may include one or more of the following features. The first positioning technique may be based on a round trip time measurement between the first device and the second device. The round trip time measurement may be based on an exchange of fine timing measurements between the first device and the second device. The second positioning technique may be based on a received signal strength indication measurement. The first positioning technique may be based on one or more millimeter wave signals transmitted from the first device. The first positioning technique may be based on one or more ultrasonic signals transmitted from the first device. The method may include determining that the first device is within a predefined contact range of the second device. An indication of the barrier may be provided to a contact tracing application. A range between the first device and the second device may be provided to the contact tracing application. A first identification value associated with the first device and a second identification value associated with the second device may be provided to the contact tracing application. A probability model may be received from a server. Detecting the barrier may include providing the first range measurement and the second range measurement to a server. Detecting the barrier may include receiving an indication of the barrier between the first device and the second device from the server. The server may be a crowdsourcing server configured to receive range measurement information, barrier detection information, and location information from a plurality of devices in a network. Detecting the barrier may be performed by the first device. At least one of the first positioning technique and the second positioning technique may be based on one or more radio frequency signals communicated in accordance with a WiFi communication protocol or a Bluetooth communication protocol. At least one of the first positioning technique and the second positioning technique may be based on one or more radio frequency signals communicated in accordance with a new radio sidelink protocol. A coarse location of the first device may be determined, and detecting the barrier may be based at least in part on the coarse location. The coarse location may be associated with an environment tag. Date and time information may be determined, such that detecting the barrier may be based at least in part on the date and time information. The first device may be a mobile or stationary device and the second device may be a mobile or stationary device. The barrier may be an architectural feature designed to separate spaces. The barrier may be a safety device designed to separate people and reduce a free communication of an airborne disease. The barrier may be a group of objects such that a density of the group of objects impedes a spread of an airborne disease.

An example method for providing barrier detection information to a device according to the disclosure includes receiving from the device an indication of a first range measurement based on a first positioning technique and an indication of a second range measurement based on a second positioning technique that is different from the first positioning technique, determining a proximate barrier based at least in part on the indication of the first range measurement and the indication of the second range measurement, and providing an indication of the proximate barrier to the device.

Implementations of such a method may include one or more of the following features. The first positioning technique may be based on a round trip time measurement and the second positioning technique may be based on a received signal strength indication measurement. The first positioning technique may be based on one or more millimeter wave signals transmitted from the device. The first positioning technique may be based on one or more ultrasonic signals transmitted from the device. Determining the proximate barrier may include querying a data structure based on the indication of the first range measurement and the indication of the second range measurement. Determining a coarse location of the device, and determining the proximate barrier may be based at least in part on the coarse location of the device. The coarse location may be associated with an environment tag. Determining date and time information, and determining the proximate barrier may be based at least in part on the date and time information. Providing the indication of the proximate barrier to a contact tracing application. Providing at least one of the indication of the first range measurement and the indication of the second range measurement to the contact tracing application. Providing an identification value associated with the device to the contact tracing application. Providing barrier classification information to the contact tracing application. The indication of the first range measurement may include a range value. The indication of the first range measurement may include a time-of-flight value. The indication of the second range measurement may include a range value. The indication of the second range measurement may include a signal strength value.

An example method for detecting a barrier with network assistance data according to the disclosure includes obtaining a first range measurement based on a round trip time procedure, obtaining a second range measurement based on a signal strength measurement, providing an indication of the first range measurement and an indication of the second range measurement to a server, and receiving an indication of a proximate barrier from the server.

An example apparatus according to the disclosure includes a memory, at least one transceiver, at least one processor communicatively coupled to the memory and the at least one transceiver and configured to determine a first range measurement with respect to a user equipment using a first positioning technique, determine a second range measurement with respect to the user equipment using a second positioning technique that is different from the first positioning technique, and detect a barrier between the apparatus and the user equipment based on the first range measurement and the second range measurement.

An example apparatus according to the disclosure a memory, at least one transceiver, at least one processor communicatively coupled to the memory and the at least one transceiver and configured to receive an indication of a first range measurement based on a first positioning technique and an indication of a second range measurement based on a second positioning technique that is different from the first positioning technique, determine a proximate barrier based at least in part on the indication of the first range measurement and the indication of the second range measurement, and provide an indication of a proximate barrier to a device.

An example apparatus according to the disclosure includes a memory, at least one transceiver, at least one processor communicatively coupled to the memory and the at least one transceiver and configured to obtain a first range measurement based on a round trip time procedure, obtain a second range measurement based on a signal strength measurement, provide an indication of the first range measurement and an indication of the second range measurement to a server, and receive an indication of a proximate barrier from the server.

Items and/or techniques described herein may provide one or more of the following capabilities, as well as other capabilities not mentioned. A first user equipment (UE) associated with a first user may be configured to detect proximate UEs that are associated with other users. One or more radio frequency (RF) signals may be exchanged to determine a range between the UEs. In an example, the RF signals may be used to determine range estimates based on time-of-flight and signal strength information. The first UE may be configured to detect the presence of a barrier based on the range estimates associated with the time-of-flight and signal strength information. The first UE may be configured to provide the time-of-flight and signal strength information to one or more network servers. The network servers may be configured to receive time-of-flight and signal strength information from a plurality of UEs in a communications network. A crowdsourced data structure may be used to improve barrier detection. Contact tracing data may include an indication of the presence of a barrier. The number of false contact reports in a contact tracing application may be reduced. Other capabilities may be provided and not every implementation according to the disclosure must provide any, let alone all, of the capabilities discussed.

DETAILED DESCRIPTION

Techniques are discussed herein for utilizing wireless devices for contact tracing, and more specifically for detecting a barrier between devices to enhance contact tracing applications. In general, detecting barriers between wireless devices, and the associated users, may enhance contact tracing applications and services for communicable diseases (e.g., SARS, H1N1, COVID-19, etc.) since barriers may prevent transmission even if two individuals are within 2 meters of each other due to a decrease in air exchange or a blocking of air flow between the respective locations of these two individuals. Wireless devices may use RF signaling to determine a range between the devices. For example, round trip time (RTT) signals may be used to generate a range estimate between two capable devices by measuring the time it takes for an RF signal to make a round trip between the two devices. The range estimated by such time-of-flight methods is typically more accurate than range estimates obtained via other RF techniques such as a received signal strength indication (RSSI) because RSSI based range estimations may be significantly degraded due to fading, blockage and multipath. A combination of RTT and RSSI measurements, however, may be used to determine if the devices are separated by a barrier such as a concrete wall or a glass window since some barriers will significantly affect RSSI while yielding little to no changes in observed RTT ranges between devices. An indication of the presence of a barrier may be provided to a contact tracing application. These techniques and configurations are examples, and other techniques and configurations may be used.

Figure 1:
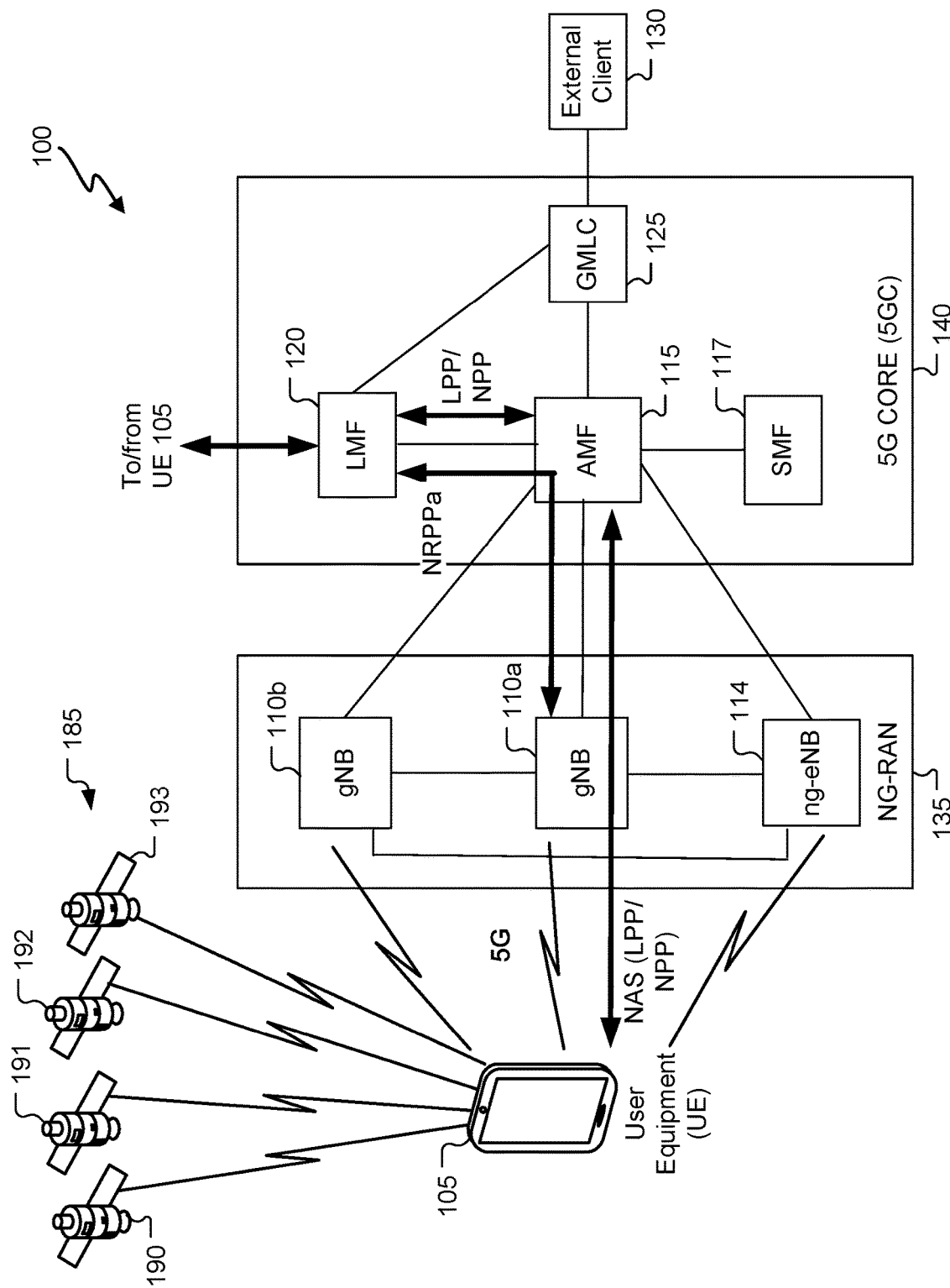
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, 5G CV2X Sidelink, 5G ProSe, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
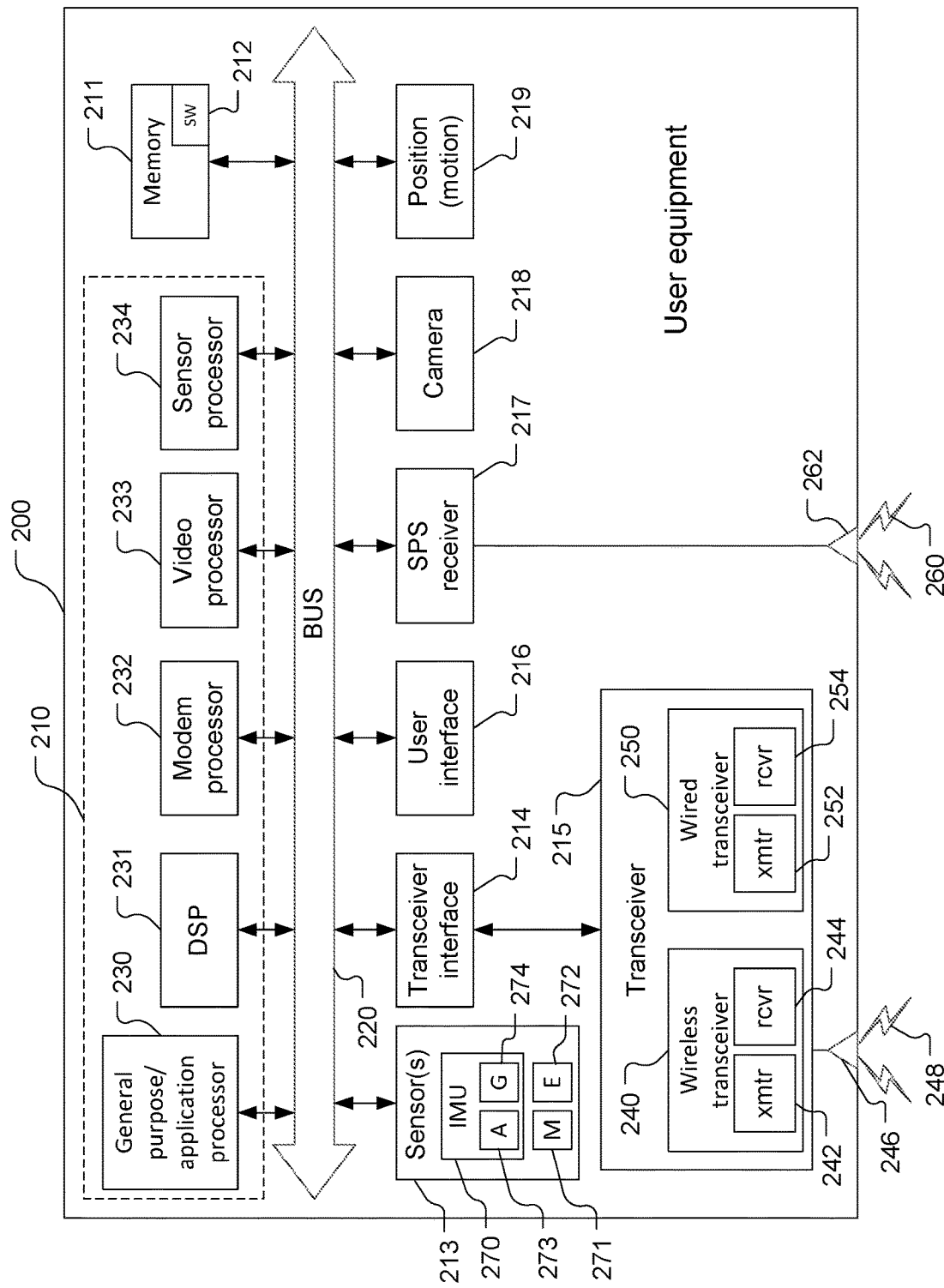
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations. The sensors processing subsystem may be embedded in a low power core that facilitates continuous logging and derivation of sensor parameters required for high level functions such as temperature sensing, location assist or dead reckoning.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee, 5G CV2X (Sidelink), 5G ProSe, etc. New Radio may use mm-wave frequencies and/or sub-6 GHZ frequencies. The wired transceiver 250 may include a transmitter 252 and a receiver 254 configured for wired communication, e.g., with the network 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
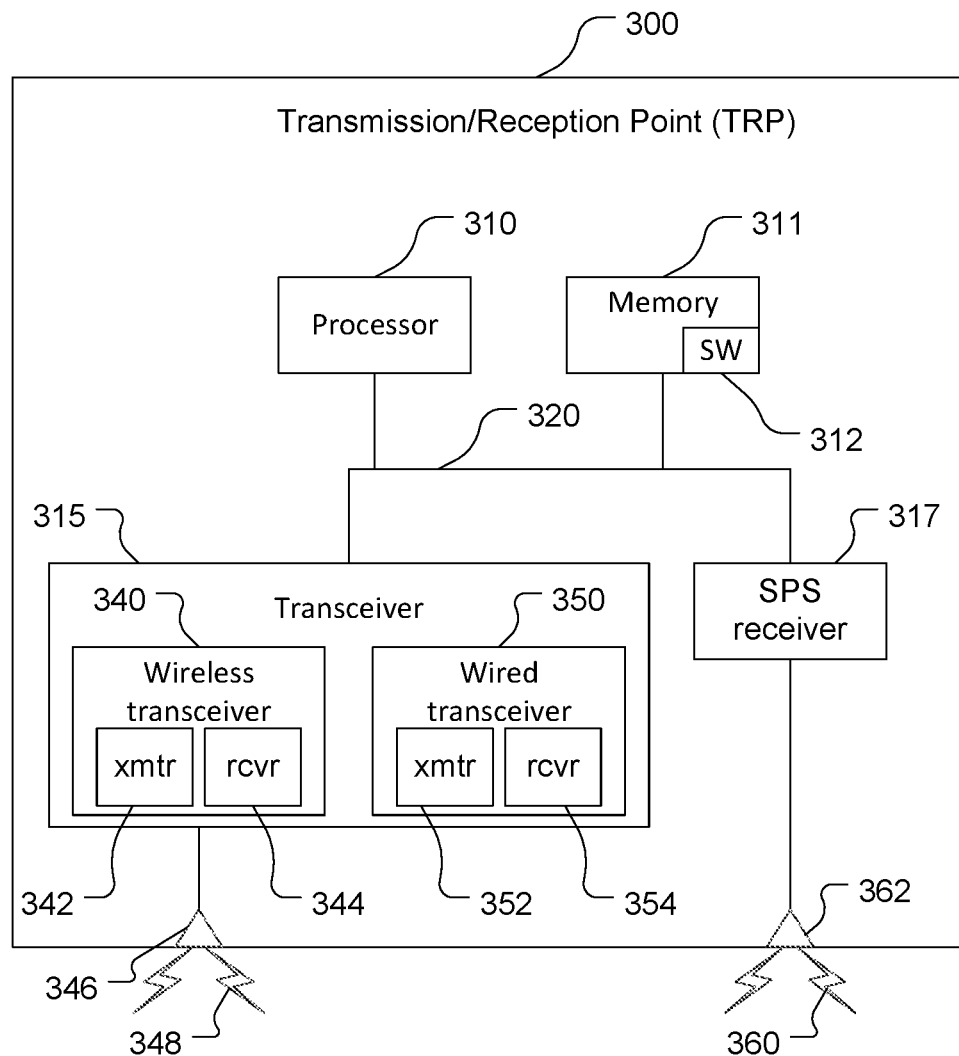
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or other network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
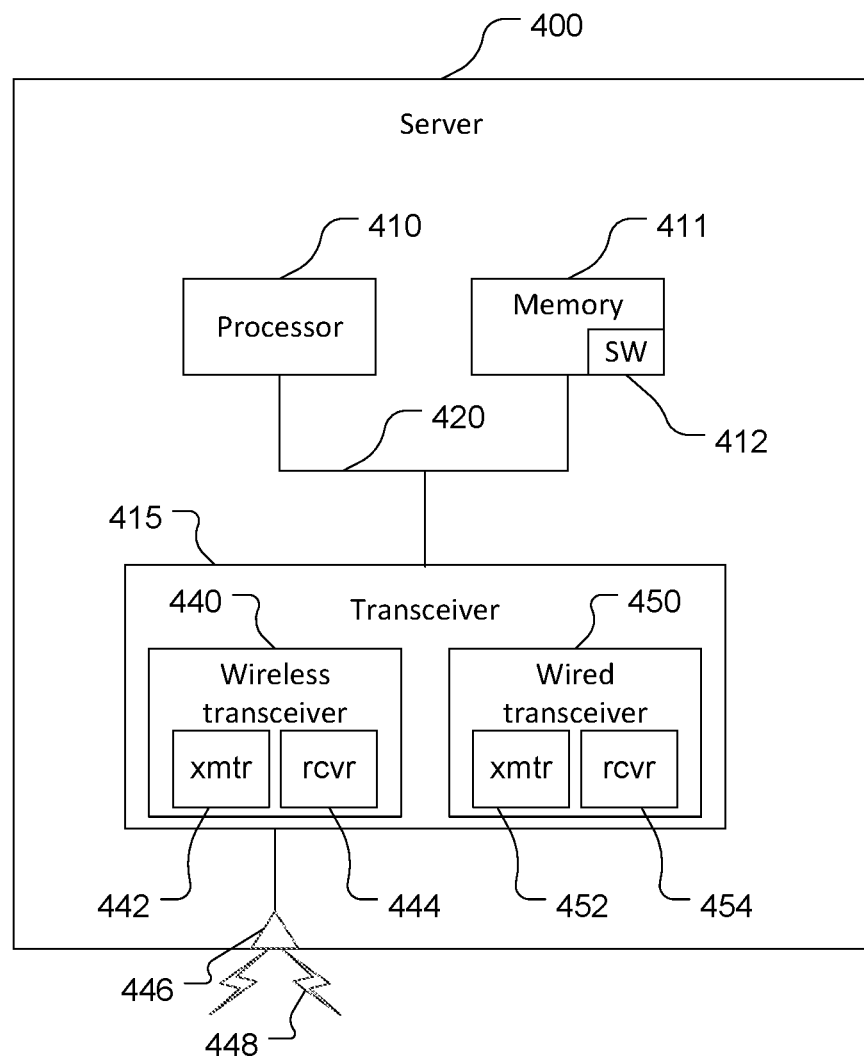
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the network 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
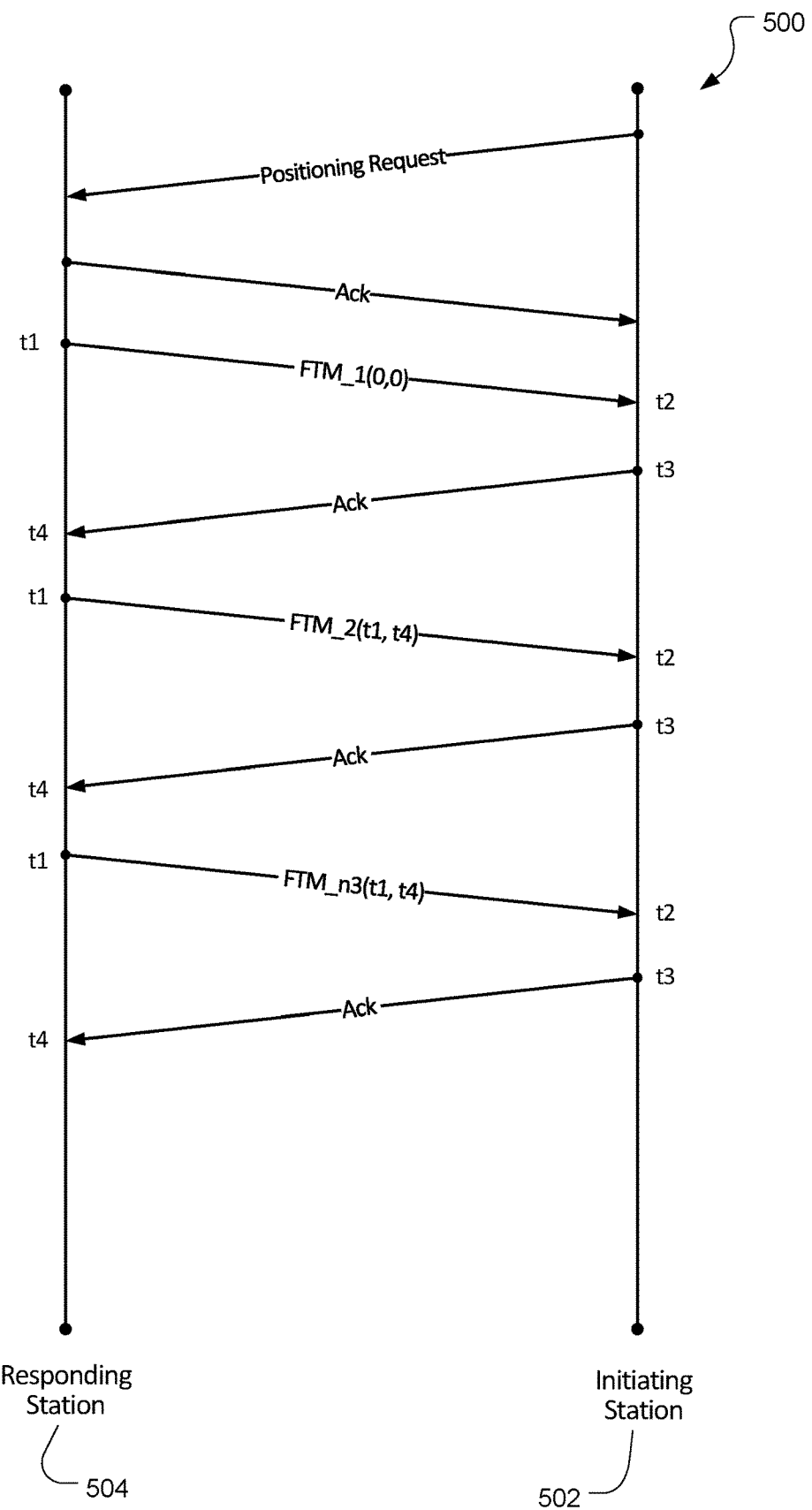
FIG. 5 is an example message flow for a round trip time measurement session.

Referring to FIG. 5, an example of a diagram of a round trip time measurement session 500 is shown. The general approach includes an initiating station 502 and a responding station 504. The initiating station 502 and the responding station 504 may be a UE such as the UE 200, or other wireless device configured to participate in time-of-flight based positioning. In an example, and not a limitation, the RTT measurement session 500 may be based on Fine Timing Measurement messages exchanged between the initiating and responding stations 502, 504. Other messages and signals such as positioning reference signals (PRS), sounding reference signals (SRS), Infra-Red camera signals, or other reference signals may be used to determine time-of-flight information between two UEs. The RTT session 500 may utilize a FTM Protocol (e.g., 802.11mc D4.3 section 10.24.6) to enable two stations to exchange round trip measurement frames (e.g., FTM frames). The initiating station 502 may request a positioning session and compute the round trip time by recording the TOA (i.e., t2) of the FTM frame from the responding station 504 and recording the TOD of an acknowledgement frame (ACK) of the FTM frame (i.e., t3). The responding station 504 may record the TOD of the FTM frame (i.e., t1) and the TOA of the ACK received from initiating station 502 (i.e., t4). The initiating station 502 may receive the time 't4' in subsequent FTM messages (e.g., FTM2 (t1,t4). Variations of message formats may enable the timing values to be transferred between the initiating and responding stations 502, 504. The RTT is thus computed as:

$$RTT=[(t4-t1)-(t3-t2)] \tag{1}$$

The RTT session 500 may allow the initiating station 502 to obtain its range with the responding station 504. An FTM session is an example of a ranging technique between the initiating station 502 and the responding station 504. Other ranging techniques such as TDOA, TOA/TOF may also be used to determine the relative positions of the two stations. Other signaling may also be used to enable a negotiation process, the measurement exchange(s), and a termination process.

Figure 6:
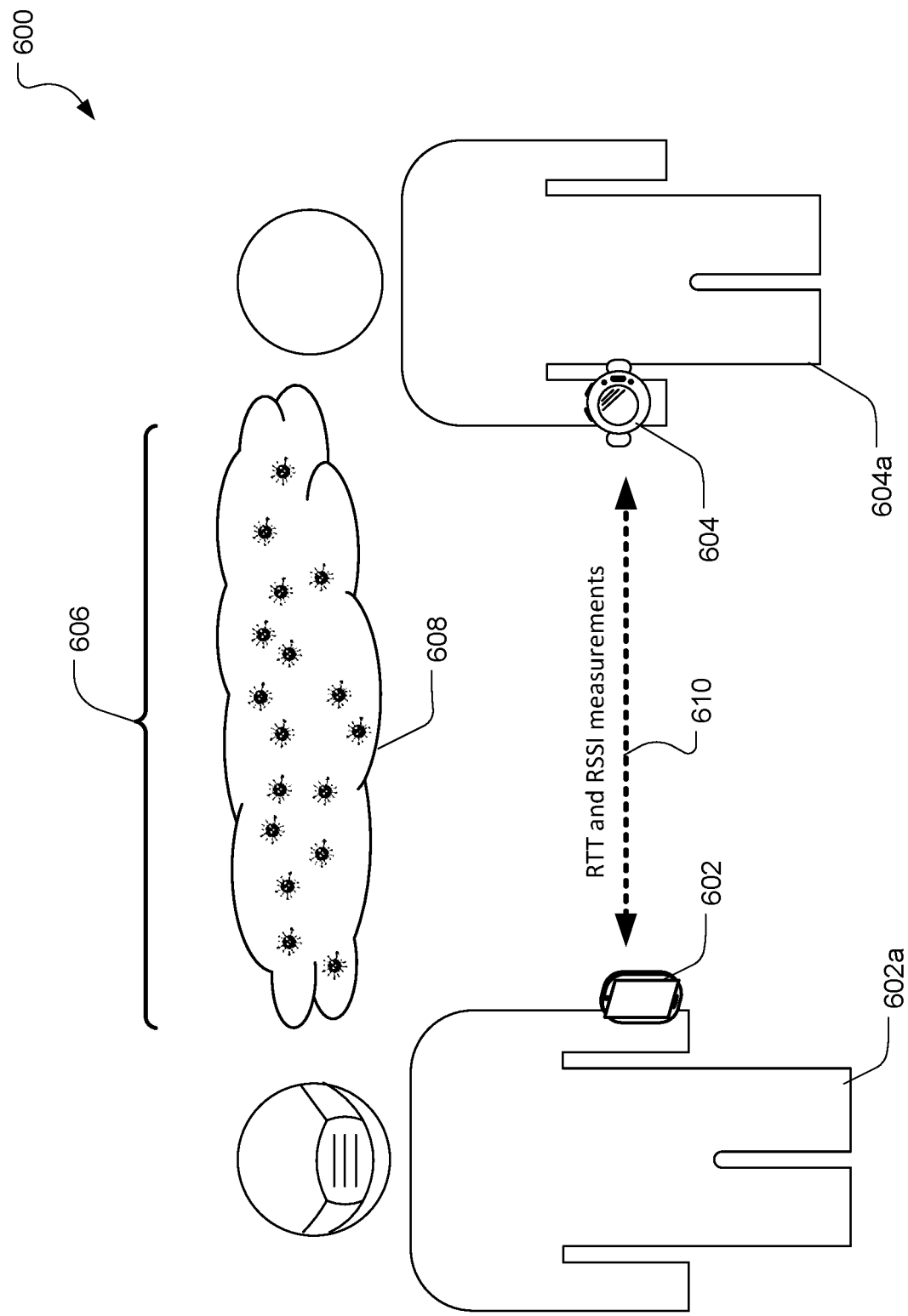
FIG. 6 is a diagram of an example contact trace proximity measurement.

Referring to FIG. 6, a diagram 600 of an example contact trace proximity measurement is shown. The diagram 600 includes a first mobile device 602 and an associated first user 602a, and a second mobile device 604 and an associated second user 604a. The mobile devices 602 and 604 may correspond to a cellphone, smartphone, smartwatch, smart glasses, laptop, tablet, PDA, tracking device, navigation device, IoT device, asset tracker, health monitors, wearable trackers, or some other portable or moveable device configured for wireless communications. In an embodiment, one or both of the mobile devices 602, 604 may be a stationary device. A contact trace application may establish a contact range 606 (e.g., social distance, physical distance) based on a modeled spreading distance of a communicable disease 608. For example, a government entity such as the Centers for Disease Control and Prevention (CDC) may establish a target contact range of 6 feet. The mobile devices 602, 604 may exchange RF signals 610 to determine a range between the users 602a, 604a. The RF signals may be based on existing wireless technologies such as, for example, IEEE 802.11 (including IEEE 802.11p), WiFi, WiFi Direct (WiFi-D), Bluetooth®, Zigbee, 5G NR, side link protocols, and other device-to-device (D2D) interfaces. In an example, the RF signals 610 may include messages for a ranging technique (e.g., RTT, TDOA, TOA) and/or for determining a signal strength measurement (e.g., RSSI). The RF signal 610 may be used to perform a range measurement to determine the distance between the first and second mobile devices 602, 604. The mobile devices 602, 604 may be configured to report the presence of one another to a network and/or notify a respective user 602a, 604a via a user interface. In an example use case, the second user 604a may be infected with a communicable disease 608 and may be utilizing a contact tracing application configured to alert other users of this condition. The first user 602a may have a pre-existing condition which elevates the severity of the communicable disease 608 and thus may also utilize the contact tracing application. If the RF signals 610 indicate a range that is less than the established contact range 606 for a period of time (e.g., a duration), then the users 602a, 604a may receive an alert indicating the proximity to one another. The contact tracing application may also be configured to report proximity information to a network server as part of a larger contact tracing effort or program. The application of the determined range based on the RF signals 610 as compared to the established contact range 606 may assist in identifying and monitoring individuals who may have had contact with an infectious person and may help to control the spread of the communicable disease 608.

Figure 7:
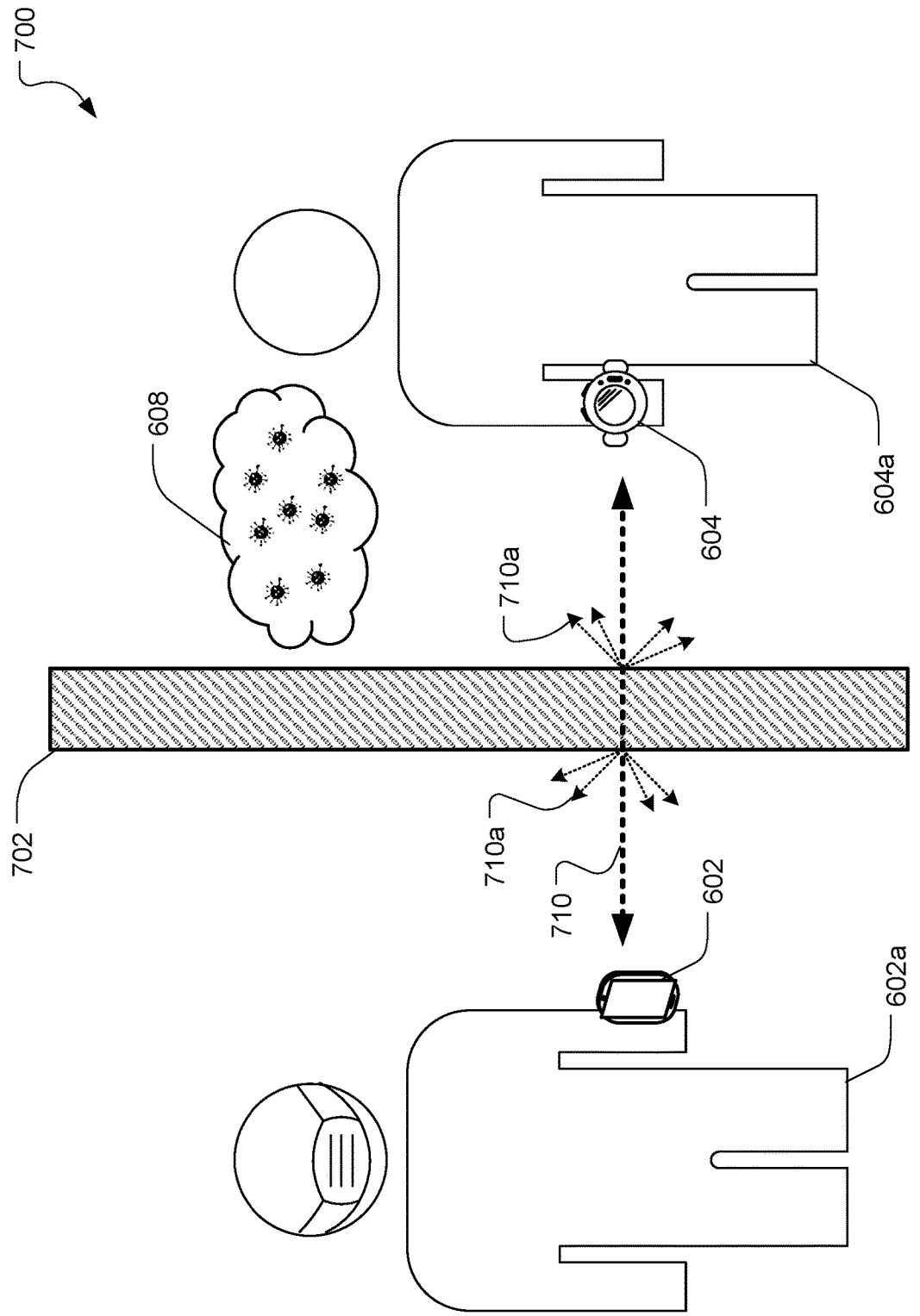
FIG. 7 is a diagram of an example contact trace proximity measurement through a barrier.

Referring to FIG. 7, with further reference to FIG. 6, a diagram 700 of an example contact trace measurement through a barrier 702 is shown. As depicted in the diagram 700, the barrier 702 is disposed between the first user 602a with the first mobile device 602, and the second user 604a with the second mobile device 604. The barrier 702 may be a wall, window, floor, ceiling or other architectural features designed to separate spaces or to limit air flow between those spaces. The barrier 702 may be other objects such as a plexiglass shield disposed around an employee (e.g., protection for a store clerk), a divider in a taxi, or other safety devices designed to separate people and reduce the free communication of an airborne disease. Groups of objects may also act as a barrier, such as traffic in a roadway, a large crowd, a crowded bookshelf in a library, shelves in a grocery store or other aisle configurations such that the density of the objects may impede the spread of the communicable disease 608. The mobile devices 602, 604 may exchange RF signals 710 through the barrier 702, however, the barrier 702 may cause some signal attenuation 710a (e.g., reflection, refraction, absorption) of the RF signals 710. The physical attributes of the barrier 702 (e.g., dimensions, material composition, orientation, etc.) will impact the amount of the attenuation 710a of the RF signals 710 and thus will impact the strength of the RF signals 710 received by the mobile devices 602, 604. In general, the barrier 702 will not impact the time-of-flight (e.g., RTT, TDOA, TOA/TOD) based range measurements. The mobile devices 602, 604 may be configured to compare the range measurements with the signal strength measurements to detect the presence of the barrier 702. For example, a differential between an expected RSSI signal and the RTT based range measurement may be proportional to a probability that the RF signals 710 are travelling through the barrier 702. That is, the expected RSSI signal may be based on known signal propagation models (e.g., shadowing model). In an example, the range 'd' based on an RSSI may be determined based on a propagation equation such as:

$$\log 10d = [L - 20 \log 10(5745) + 28]/24 \quad (2)$$

where, d is the range; and
L is the path loss (e.g., L=23 dBm−<RSSI value>).

A contact tracing application may utilize an indication that a barrier is present between two users to modify user alerts and reduce the number of active contacts being tracked. For example, the presence of the barrier 702 may cause the contact tracing application to extend the amount of time the users would have been within the contact range 606 before generating an alert or providing a contact report. In an example, the contact tracing application may utilize the range and signal strength information to classify the barrier 702 (e.g., based on material composition and expected function) and evaluate the potential contact event based in part on the classification of the barrier 702. That is, if the barrier 702 is classified as an interior wall, the probability that the communicable disease 608 may spread from the second user 604a to the first user 602a may be reduced.

Figure 8:
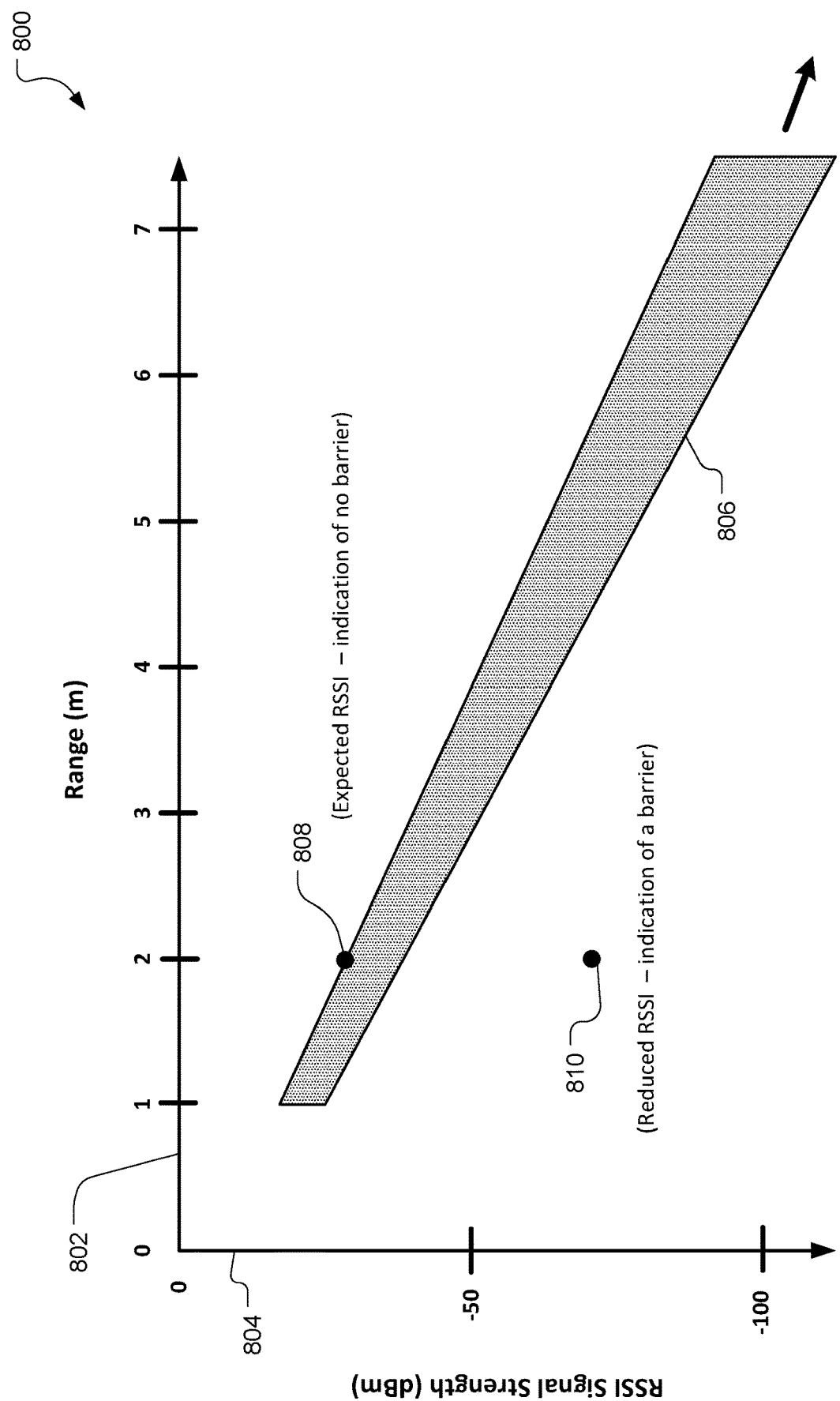
FIG. 8 is a graphical example of a probability function for detecting a barrier with radio frequency signals.

Referring to FIG. 8, a graphical example of a probability function for detecting a barrier with radio frequency signals is shown. A graph 800 includes a range axis 802 (in meters (m)) and a signal strength axis 804 (in decibel-milliwatts (dBm)). An example probability function 806 is plotted on the graph 800 to demonstrate the probable signal loss and growing uncertainty as a function of the range. The probability function 806, and the associated range and signal strength values are examples, and not a limitation, as other probability functions may also be generated based on empirical observations and used to detect a barrier. In an example, the range values may be based on RF signal measurements such as RTT based ranges and the probability function 806 may be a correlation of RTT based ranges and the corresponding RSSI measurements. Referring to FIG. 6, the RF signals 610 may correspond to a first measurement point 808 indicating a range of 2 m and a RSSI measurement of approximately −25 dBm. The RSSI measurement value for the first measurement point 808 is within, or greater than, the probability function 806 and thus indicates that no barrier is present between the mobile devices 602, 604. In contrast, referring to FIG. 7, the RF signals 710 may correspond to a second measurement point 810 indicating a range of 2 m and a RSSI measurement of approximately −70 dBm. The RSSI measurement value for the second measurement point 810 is less than the probability function 806 and thus indicates the presence of a barrier (i.e., the barrier 702) between the mobile devices 602, 604.

In an embodiment, the probability function 806 may be expressed as:

$$P(\text{Barrier}) \propto \Delta(\text{RangeEst}_{rssi})\text{RangeEst}_{t\_flight}) \quad (3)$$

where the Δ function provides a metric of difference between the range estimates based on two relative positioning techniques. The metric may be binned (e.g., histogram bin) and the bin sizes may be implementation specific. In an example, the probability function may be expressed using a Bayesian estimation $$P(\text{Barrier} \mid d) = \frac{P(d \mid \text{Barrier}) * P(\text{Barrier})}{P(d)} \quad (4)$$

where 'd' is an indication of a metric falling in the $d^{th}$ bin;
P(d|Barrier) may be measured by empirical data;
P(Barrier) is the Apriori probability that two devices have a barrier between them;
P(d) is the Apriori probability of difference metric corresponding to the measured value.

In an embodiment, the probability function 806 may be based on crowdsourced empirical data provided to one or more network servers from a large number of devices in a wireless network. In an example, one or both of the mobile devices 602, 604 may be configured to provide the RTT and RSSI range measurements and their current locations to a crowdsourcing server. Other information associated with a potential barrier such as an optical image (e.g., via a camera) or radio frequency (RF) sensing information, ultrasound measurements, or other measurements based on the capability of the mobile device may be provided to the crowdsourcing server.

Figure 9:
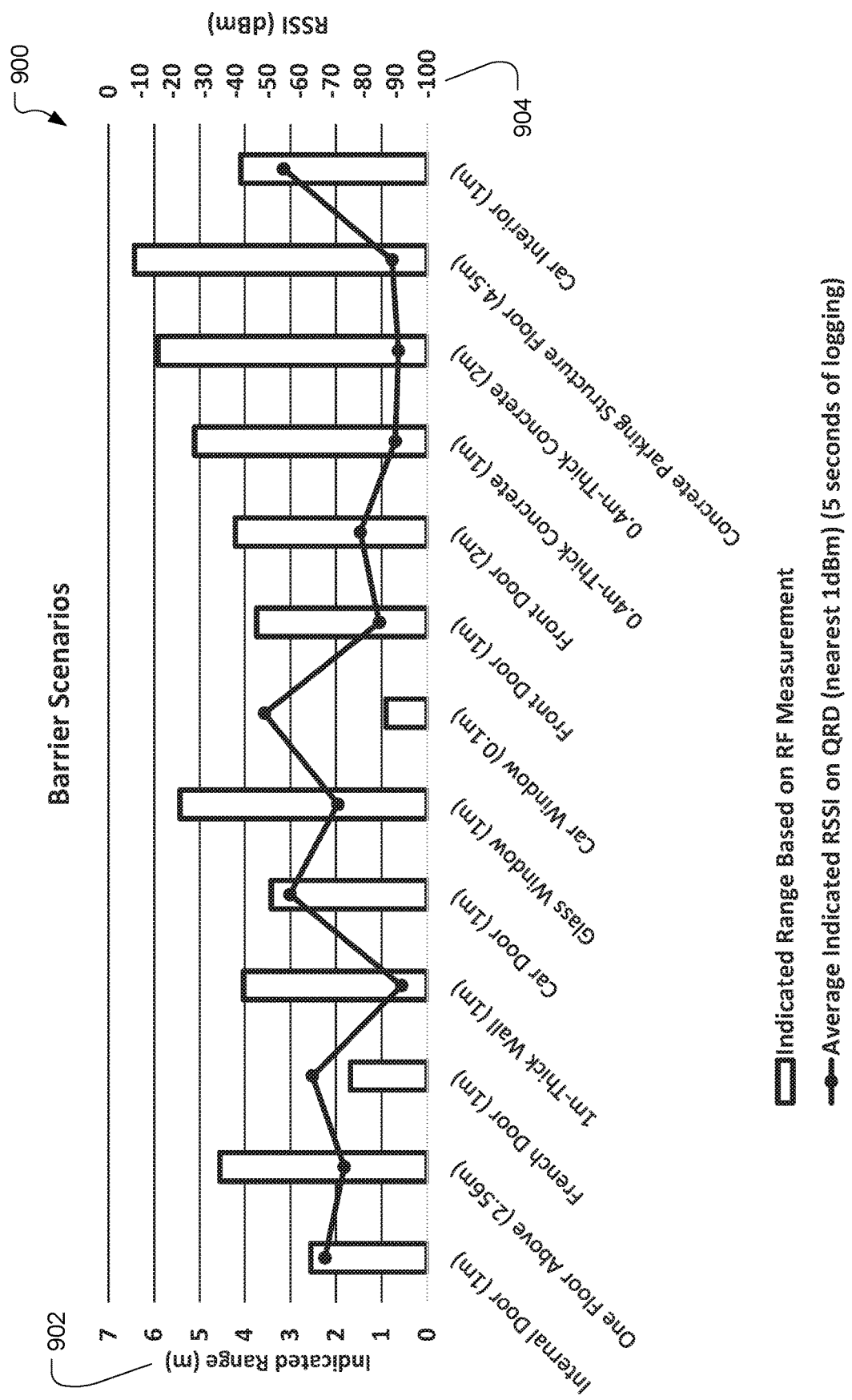
FIG. 9 is a graph of example barrier scenarios.

Referring to FIG. 9, a graph 900 of example barrier scenarios is shown. The barrier scenarios and corresponding measurement values are examples and not limitations as other materials and measurements may be used to derive probability functions and classification models. The graph 900 includes an indicated range axis 902 and a RSSI measurement axis 904. The indicated ranges are based on RTT measurements through the indicated barrier and the RSSI measurements represent the average RSSI over 5 seconds of logging. As indicated in the graph 900, the RSSI measurements may be significantly impacted based on the barrier material. As expected, denser structures such as concrete attenuate the RF signals more than less dense structures such as an internal door. A probability function may be generated based on large samples of different barrier scenarios and used to predict the presence of a barrier based on the ranging and signal strength measurements. In an example, RF signals may be measured in different frequency layers and the corresponding differences in attenuation may be used to further classify a barrier. In an embodiment, machine learning techniques may be used to further characterize the time based range measurement and signal strength measurements based on the composition of the barrier.

Figure 10:
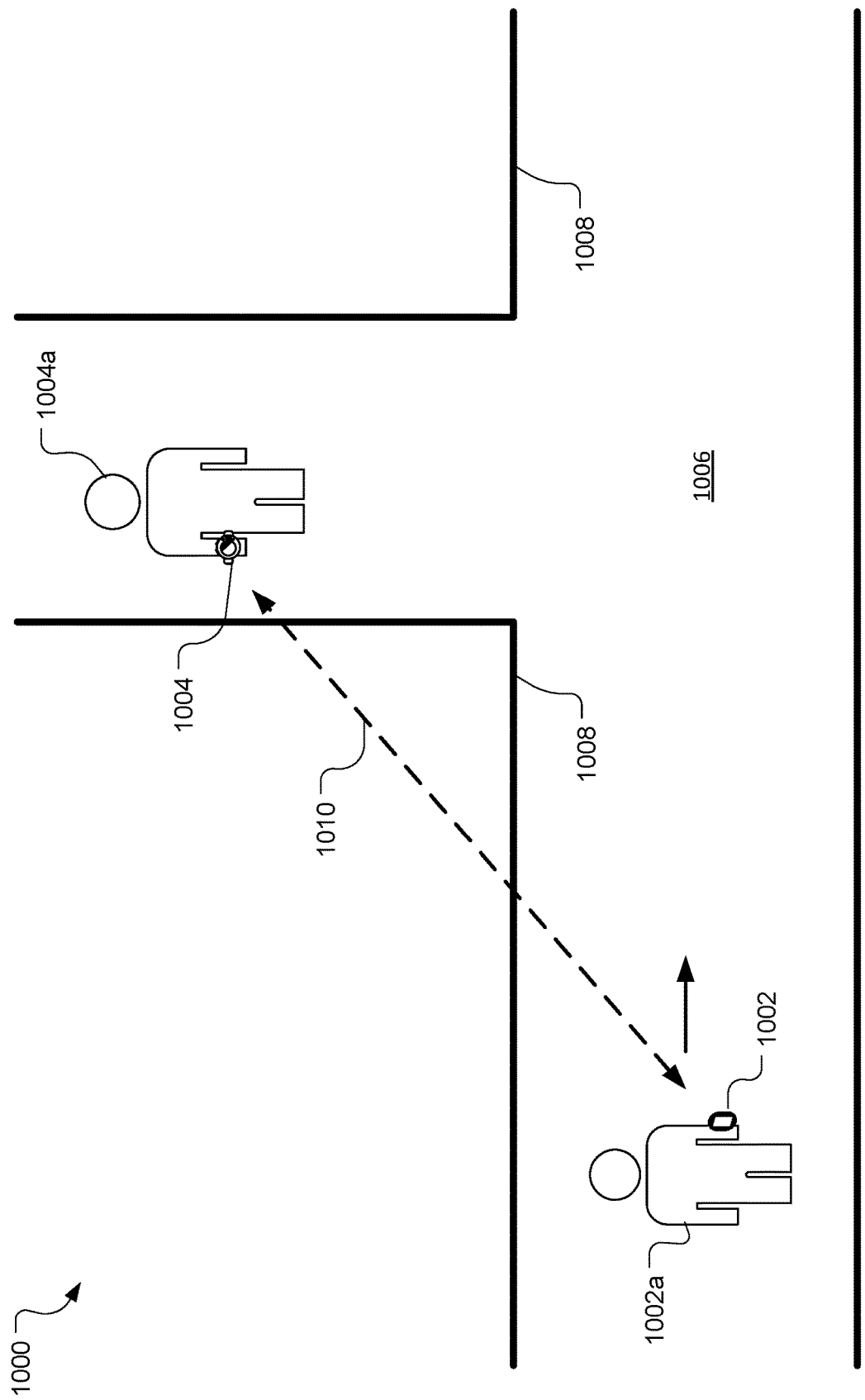
FIG. 10 is a diagram of an example contact trace use case including users moving relative to a barrier.
Figure 11A:
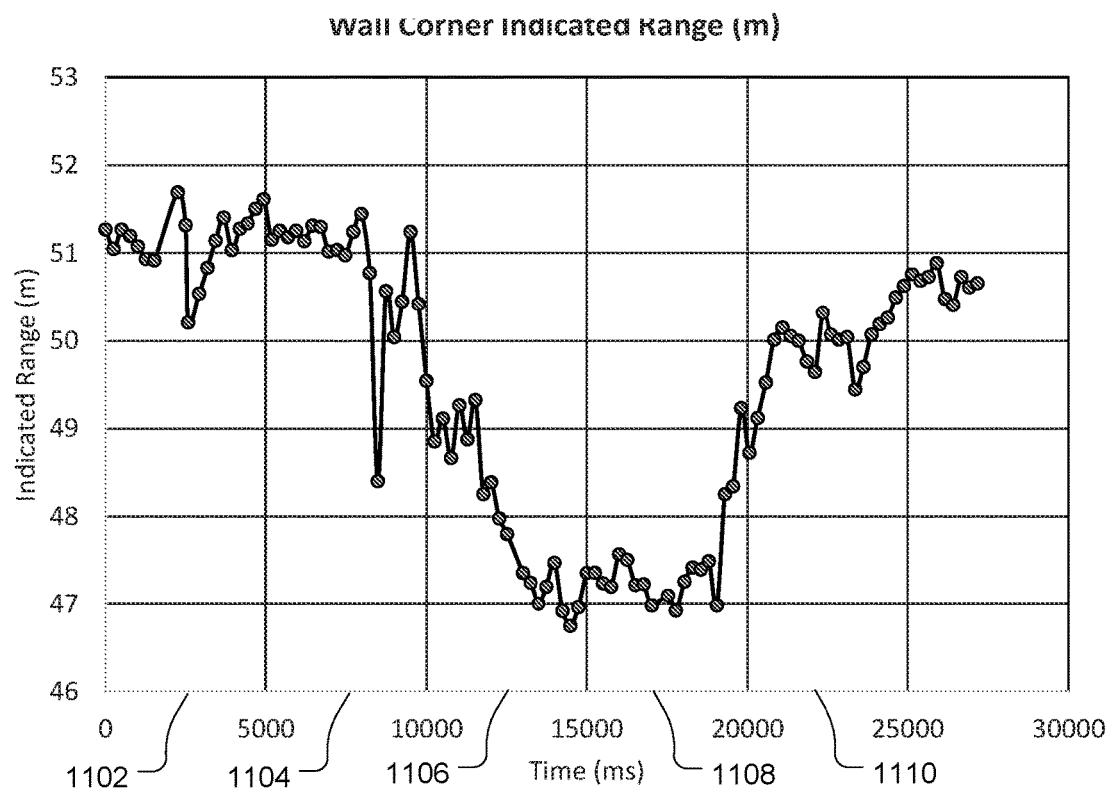
FIGS. 11A and 11B are example range and signal strength measurements for the contact trace use case of FIG. 10.
Figure 11B:
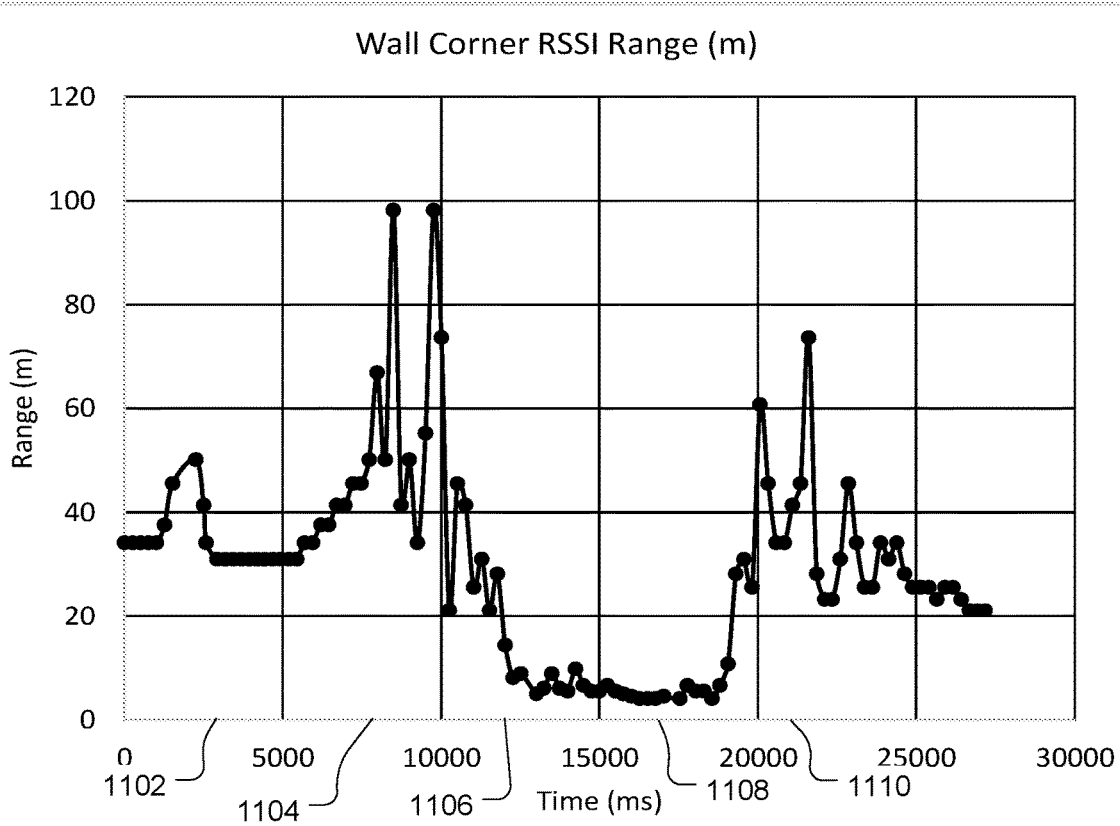

Referring to FIG. 10, a diagram 1000 of an example contact trace use case including users moving relative to a barrier is shown. The diagram 1000 includes a first mobile device 1002 associated with a first user 1002a, and a second mobile device 1004 associated with a second user 1004a. A barrier 1008 comprising one or more walls is disposed between the users 1002a, 1004a. The first user 1002a is moving towards an intersection 1006 and will have a direct line of sight (i.e., with no barrier) to the second user 1004a for part of the transit. The mobile devices 1002, 1004 are exchanging RF signals 1010 throughout the transit and the barrier 1008 is obstructing the RF signals 1010 during a portion of the transit. In an example, the mobile devices 1002, 1004 may include map data or indoor building plan data or fire route data which may be used to identify specific regions such as the intersection 1006 and the barrier 1008. FIGS. 11A and 11B are example RTT ranges and respective signal strength measurement ranges for the RF signals 1010 as the first user 1002a transits through the intersection 1006. A first time slot 1102 (i.e., 0-5000 msec) includes the measurements when the first user 1002a is 2 meters away from the start of the intersection 1006. As indicated in the RSSI range, the barrier 1008 provides a steady signal loss during the first time slot 1102. A second time slot 1104 (i.e., 5000-10000 msec) includes the measurements when the first user 1002a is at the start of the intersection 1006 (i.e., the first corner). The RSSI range remains almost steady as the range decreases and then increases as the first user approaches the intersection 1006. A third time slot 1106 (i.e., 10000-15000 msec) includes the measurements when the first user 1002a is in the intersection 1006. A fourth time slot 1108 (i.e., 15000-20000 msec) includes the measurements when the first user 1002a approaches the end of the intersection 1006 (i.e., the second corner). The mobile devices 1002, 1004 have an unobstructed path during the third and fourth time slots 1106, 1108 and thus the RSSI range decreases. A fifth time slot 1110 (i.e., 20000-25000 msec) includes the measurements when the first user 1002a is 2 meters away from the intersection 1006 (i.e., on the other side). The RSSI range values increase as expected in the fifth time slot 1110 when the barrier 1008 begins to obstruct the RF signals 1010. The time based range and RSSI based measurements may be used to provide advanced notice to contact tracing application of a barrier status. For example, the fusion of reducing range combined with sharply decreasing RSSI range may indicate that a barrier between two people may be disappearing.

Figure 12:
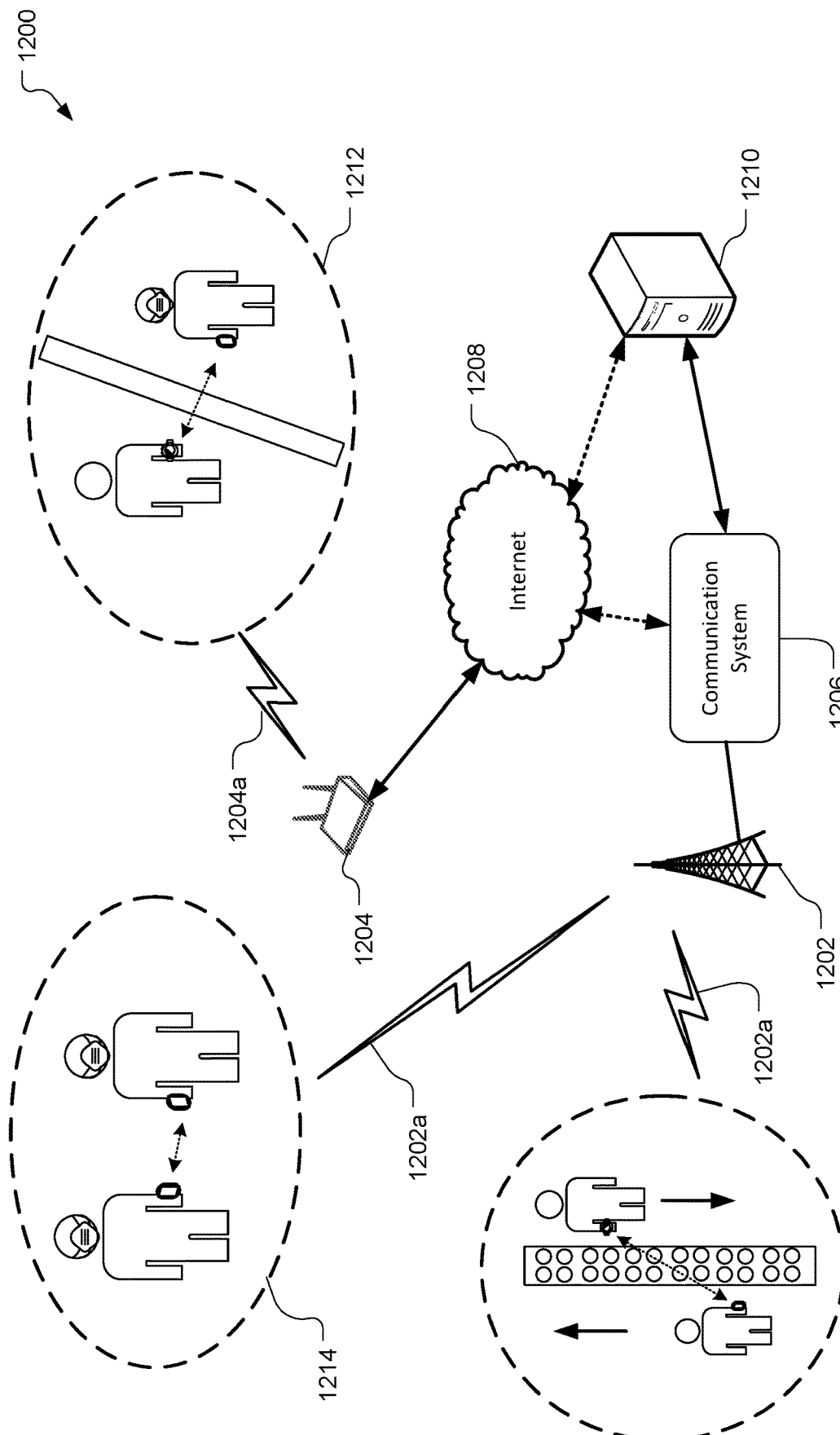
FIG. 12 is a diagram of an example system for crowdsourcing barrier detection measurements.

Referring to FIG. 12, with further reference to FIGS. 1-11, a diagram 1200 of an example system for crowdsourcing barrier detection measurements is shown. The diagram 1200 includes a base station 1202 and an access point 1204 operably coupled to a communication system 1206. The communication system 1206 is an example of the communication system 100 and the base station 1202 may be a TRP 300 such as the gNB 110a. The access point 1204 may also be a TRP 300 such as a femto cell or other WiFi enabled wireless router that may be configured to communicate via the Internet 1208. In an example, the access point 1204 may be an Edge computing device configured to extend or proxy cloud functions. A crowdsourcing server 1210 is an example of a server 400 and may be included in the communication system 1206 (e.g., the LMF 120) or may be accessed directly or indirectly via the Internet 1208 (e.g., the external client 150). In an example, the crowdsourcing server 1210 may be configured as a web service and accessible via the Hypertext Transfer Protocol (HTTP). Wireless devices may be configured to communicate with the crowdsourcing server 1210 via known wireless communication interfaces such as cellular communications 1202a (e.g., GSM, CDMA, HRPD, LTE, 5G NR, etc.) and WLAN communications 1204a (e.g., WiFi, BT, Zigbee, etc.). For example, one or more users in a first barrier detection event 1212 may provide range and signal strength measurements to the access point 1204 via WiFi (e.g., WLAN communications 1204a). The users in a second barrier detection event 1214 may utilize a LTE network, and the users in a third barrier detection event 1216 may utilize a 5G network to provide range and signal strength measurements.

In an embodiment, the crowdsourcing server 1210 may include one or more data structures comprising RF signal measurements values and/or detection models based on barrier detection events. In an embodiment, the crowdsourcing server 1210 may be hosted in a Mobile Edge Compute device and the MEC may be embedded in city infrastructure (e.g. Road Side Unit (RSU)) and consumer equipment such as Consumer Premises Equipment (CPE). In an embodiment, the crowdsourcing server 1210, or another networked server 400, may be configured to generate one or more barrier probability functions based on the collection of barrier detection events. In another embodiment, the devices may be configured to develop local models and provide the models to the crowdsourcing server 1210. Referring to equations (3) and (4) above, P(Barrier) and P(d) models can be further enhanced by considering the real life use case scenarios such as the barrier detection events 1212, 1214, 1216. For example, in a significant large number of use cases, a barrier may be used by employees who interact with large numbers of customers (e.g., grocery store checkout counters, bank tellers, etc.). As a result, in some locations, with certain users (e.g., employees who are at work behind the barriers), in a specific time of day and/or certain days of the week (e.g. working hours of the employee), the Apriori probability of a device being behind a barrier will be high. This characteristic may be learned by a device by maintaining a database of Apriori Probability of being behind a barrier, which may be updated when the device makes a range (e.g., RTT) and signal strength (e.g., RSSI) measurement (and as a result, has an estimate of d). In an example, to account for the time variability of the data structure, the data may be indexed by "Time of day". When the system is operational, each measurement of d, can be used to create a better model for P(d) and P(Barrier) to match the actual use of a device. Models created by individual devices may be periodically sent to the crowdsourcing server 1210 to create a global model of P(d) and P(Barrier) by aggregating the device based models. New devices in the network may be configured to download the P(d) and P(Barrier) models from the crowdsourcing server 1210, and may further continue to update the model locally based on the measurements made by the device. In an example, the data structure(s) that maintain the model of P(Barrier) and P(d) may be location dependent and the indexing structure may be extended to include a Coarse Location Index.

In an example, a data structure including probability functions including P(Barrier) and P(d) may be maintained locally on each device, and each device may be configured to calculate P(Barrier|d) individually. Because of the asymmetry between two different devices due to these self-learned models, two peer devices (e.g., device A and device B) may estimate different values for P(Barrier|d), even if both the devices estimate the same value of d. To resolve this asymmetry, $P_{A,B}$(Barrier|d) may be calculated as:

$$\text{Max}(P_{A \to B}(\text{Barrier}|d), P_{B \to A}(\text{Barrier}|d)) \quad (5)$$

where $P_{A \to B}$(Barrier|d) is the probability estimate made by device A for being behind a barrier from device B.

An example algorithm to maintain the apriori probability data structure for determining the probability that a barrier is present may include maintaining a data structure of Apriori Probabilities (AprioriProbOfBarrier) which is indexed by a number of hours elapsed since 12:00a.m. Sunday. (i.e. 168 entries). The data structure is initialized to a variable Pbarrier_init for all the entries. After ranging (e.g., RTT) and signal strength (e.g., RSSI) measurements performed by the device with any other proximate device, the device may estimate d and update the data structure entry (corresponding to the current time) as:

$$\text{AprioriProbOfBarrier(DBIndex(current time))}_{new} = \alpha * \text{AprioriProbOfBarrier(DBIndex(current time))old} + (1-\alpha)*(1-\exp(-\Delta)) \quad (6)$$

where α is a parameter that controls the learning speed; and

Δ is the metric of difference between the range based on signal strength and the range based on round trip time values.

With such a database maintained, P(Barrier)=AprioriProbOfBarrier(DBIndex(current time)).

With such a data structure maintained, the probability function may be determined as:

$$P(\text{Barrier})=\text{AprioriProbOfBarrier(DBIndex(current time))}. \quad (7)$$

Figure 13:
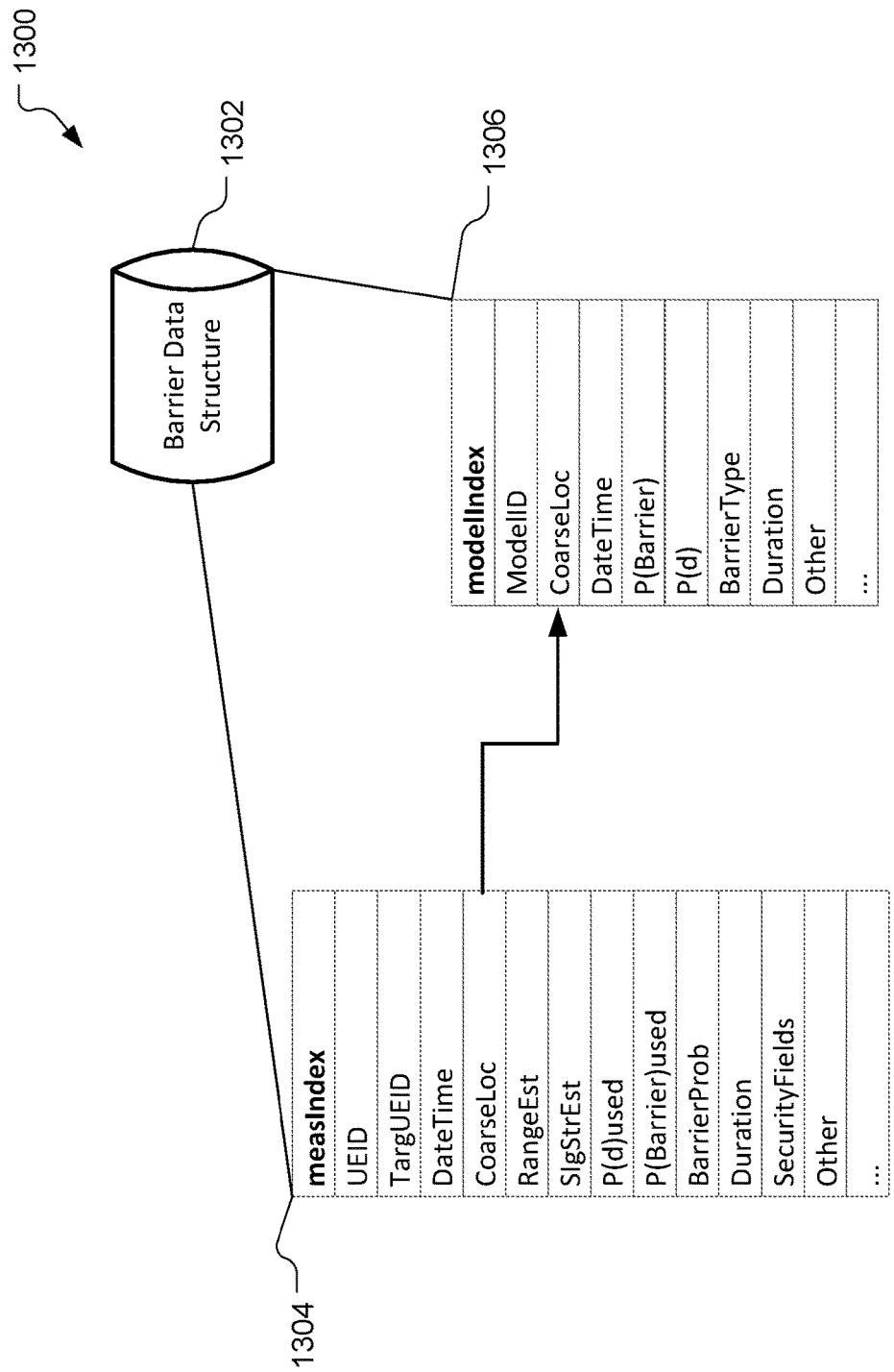
FIG. 13 is an example data structure including barrier probability functions.

Referring to FIG. 13, an example data structure 1300 including barrier probability functions is shown. The data structure 1300 may persist on the crowdsourcing server 1210, on another networked server 400 such as the LMF 120, or on a UE 200. The data structure 1300 may be disposed on a memory device 1302 such as a solid state or mechanical hard drive, and may include a plurality of data records stored in a relational database application (e.g., Amazon Aurora, Oracle Database, Microsoft SQL Server, MySQL, DB2, etc.), or stored in one or more flat files (e.g., JSON, XML, CSV, etc.). The table structures and fields in the data structure 1300 are examples, and not a limitation, as other data fields, tables, stored procedures and indexing schemas may be used to construct the data structure 1300. In an example, a measurement table 1304 may be configured to capture elements associated with barrier detection events between two devices. A UEID field and a Target UEID field may be used to uniquely identify the proximate devices. The ID fields are optional and may be modified (e.g., encrypted) or eliminated to preserve user privacy. Date and time fields and coarse location fields may be used to provide additional context to the barrier detection event. In an example, the coarse location field may be used as an index to obtain a probability function (also referred to as a model). Range and signal strength estimate values indicate the time-of-flight range (e.g., RTT) measurements and the signal strength (e.g., RSSI) measurements obtained by the device(s). P(d) used and P(Barrier) used fields may indicate the respective apriori probability of difference metric and probability used to calculate the barrier probability (i.e., P(Barrier|d) per equation (4)). In an example, the P(d) used and P(Barrier) used values may be obtained from a models table 1306 based at least in part on an environment tag/coarse location. A duration field may indicate the extent of exposure or contact to/with infected persons. One or more security/privacy fields such as a Trusted Location, a Trusted Time, a Device Attestation Token, a Device ID (privacy preserving), etc., may be included in the measurement table 1304. The model table 1306 may include model records calculated locally by a device and/or received from the crowdsourcing server 1210. In an example, the model table 1306 may include a Model ID field to identify the record based on a model group. A coarse location field and date and time fields may be used to constrain a list of potential models based on the respective location and time of actual measurements. P(d) and P(Barrier) fields may indicate the respective apriori probability of difference metric and probability a device may be used to calculate the barrier probability per equation 3. The coarse location may be an environment tag and may include additional fields to define locations such as cities, campuses, buildings, floors, or other zones in which the probability models may be used. In an example, the coarse location information may be associated with map data such as building floor plan and may be utilized to identify specific regions (e.g., intersections, hall ways, etc.). In an embodiment, a BarrierType field may indicate the composition of a barrier (e.g., concrete, glass, drywall, etc.) based on a crowdsourced data set. For example, machine learning or neural networks may be used to estimate a barrier composition based on the measured signal data. A duration field may be included to capture extent of exposure or contact to/with infected persons. Other fields may also be used. For example, transmitter power and receiver sensitivity associated with the devices and the measurement values may be included to modify the observed signal strength. Measurement frequency values may also be captured because some devices may have the ability to obtain measurements with different frequencies, and barriers may attenuate each of the frequencies differently. Other security fields may be included that improve the assurance of the measurements such as Trusted Location, Trusted Time, Device Attestation Token, Device ID derived from Hardware Root-of-Trust. In addition, other privacy preserving attributes may be added such as Device ID encrypted with derived privacy preserving keys stored in hardware e-fuses.

Figure 14:
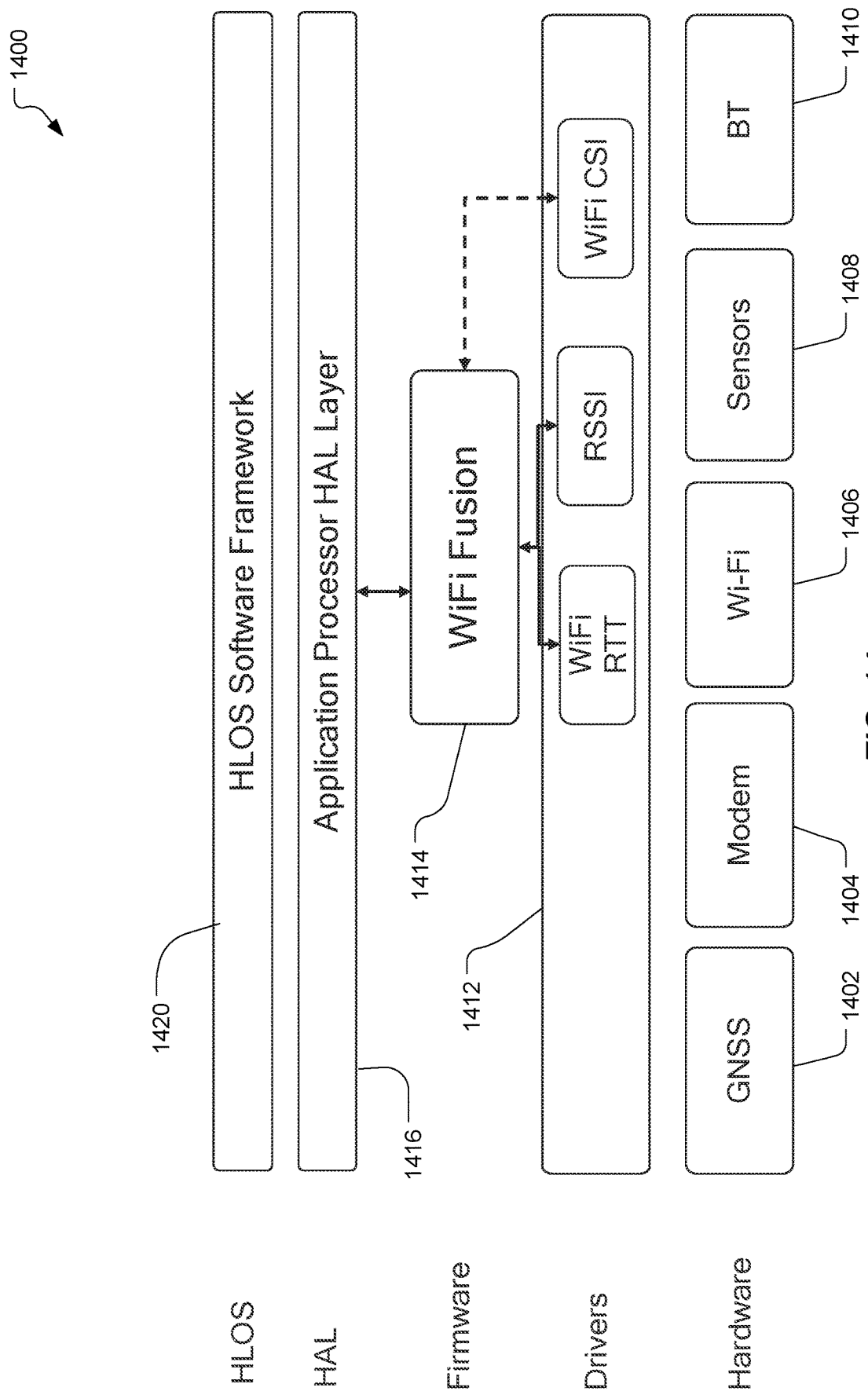
FIG. 14 is an example framework diagram of a user equipment for contact tracing.

Referring to FIG. 14, with further reference to FIG. 2, an example framework 1400 diagram of a user equipment for contact tracing is shown. The framework 1400 is an example of a framework utilized by the UE 200. In an example the framework 1400 includes hardware modules such as a GNSS module 1402, a modem module 1404, a WiFi transceiver 1406, a sensors module 1408 and a BLUETOOTH (BT) transceiver 1410. The GNSS module 1402 may include a SPS receiver 217, the modem module 1404 may include a modem processor 232, the WiFi transceiver 1406 may include a wireless transceiver 240, the sensors module 1408 may include a sensor processor 234, and the BT transceiver 1410 may include a wireless transceiver 240. A drivers layer 1412 may include instructions to configure the WiFi transceiver 1406 and/or the BT transceiver to perform ranging and signal strength measurements. In an example, the UE 200 may include a plurality of transmit and receive antenna pairs and the WiFi transceiver may be configured to determine channel state information (CSI) for the various antenna pairs. In an embodiment, a WiFi Fusion firmware module 1414 may include hardware and software components to obtain RF signal measurements and reduce the demand on the application processor (e.g., the application processor 230). The WiFi Fusion firmware may interface with a hardware abstraction layer (HAL) 1416. A high-level operating system (HLOS) 1420 may provide an embedded OS to provide higher level services such as multimedia playback, Graphical User Interface (GUI) frameworks including built-in touch screen support and other features required for mobile device applications. The framework 1400 is an example and not a limitation as other hardware, drivers and firmware may be used. For example, additional firmware modules may include database applications, multi-modal RF fusion, geofencing and history/batching modules. The UE 200 may include one or more secure processors, Trusted Execution Environments, and the framework 1400 may utilize corresponding trusted applications and trust zones for secure processing and exchange of contact tracing information. For example, a secure processor may be an ARM Cortex based processor and may include an ARM TrustZone to enable embedded security options. The UE 200 may also include hypervisors running on processors that support multiple trusted virtual machines that conduct sensing operations protected from malware that could run on high level operating systems.

Figure 15A:
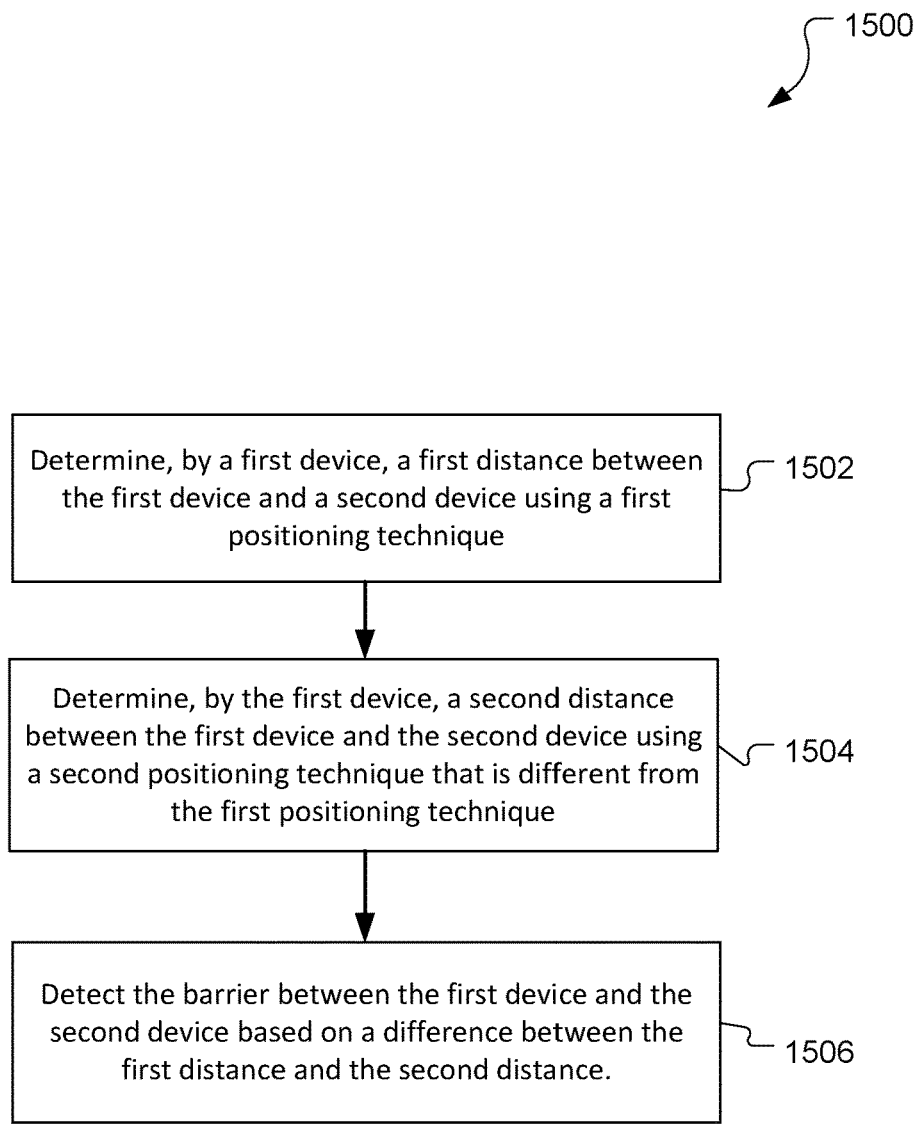
FIG. 15A is a process flow for an example method for detecting a barrier with a device.

Referring to FIG. 15A, with further reference to FIGS. 1-14, a method 1500 for detecting a barrier with a device includes the stages shown. The method 1500 is, however, an example and not limiting. The method 1500 may be altered, e.g., by having stages added, removed, rearranged, combined, performed concurrently, and/or having single stages split into multiple stages.

At stage 1502, the method includes determining, by a first device, a first distance between the first device and a second device using a first positioning technique. The UE 200 is a means for determining the first distance. The first and second devices may include combinations mobile and stationary devices. For example, the two devices may both be mobile devices such as depicted in FIG. 6, or one of the devices may be a stationary device such as an access point, point of sale (POS) terminal, automated teller, etc. In an embodiment, the first positioning technique may be a time based range measurements such as RTT measurements or other time-of-flight positioning techniques such as TDOA and TOA/TOD. In an example, the RTT measurements may be based on an FTM exchange with the device. Other reference signals such as sidelink SRS in a 5G NR capable UE may be used. In an embodiment, other positioning techniques such as millimeter wave ranging and ultrasonic ranging may be used. For example, an ultrasonic sensor on a mobile device may be configured to generate an ultrasonic signal and determine a range to a barrier based on the time required to detect a reflected signal. RF sensing may also be used to determine a range to a barrier. For example, a RF transmitter may be configured to transmit an RF signal and detect the RF signal(s) reflecting off of proximate objects. The range to a barrier is based on the time required between transmitting the RF signal and detecting the reflection(s) (e.g., radar). The first positioning technique may include utilizing more than one channel (i.e., multiple frequencies). The method 1500 may be initiated when the device is within a predefined contact range such as the contact range 606.

At stage 1504, the method includes determining, by the first device, a second distance between the first device and the second device using a second positioning technique that is different from the first positioning technique. The UE 200 is a means for determining the second distance. In an example, second positioning technique may be a signal strength measurement such as a RSSI measurement based on RTT signals received from the second device. Other RF signals may also be used to obtain the RSSI. In an embodiment, the second positioning technique may utilize multiple frequencies. The first and second positioning techniques may utilize existing wireless technologies such as, for example, WiFi, WiFi-D, BT, Zigbee, 5G NR, side link protocols, and other D2D interfaces (e.g., PC5).

At stage 1506, the method includes detecting the barrier between the first device and the second device based on a difference between the first distance and the second distance. The UE 200 is a means for detecting a barrier. In an example, the UE 200 may include a local data structure including apriori probability values associated with the range and signal strength measurements. For example, the local data structure may include one or more of the tables, records and fields in the data structure 1300. The UE 200 may determine a probability value based on the measurements and the data structure to detect the barrier. For example, a barrier may be detected if the probability value is above an established threshold. In an embodiment, the UE 200 may utilize one or more of a current time, a current date, and a current coarse location to query the data structure and obtain probability values. The coarse location may correspond to an environment tag associated with location such as a campus, building, floor, or other geographic area. In an embodiment, the data structure 1300 may persist on a first device and may be provided to a second device via a sidelink. In a contact tracing application, an indication of the barrier and/or the probability value may be provided to characterize the contact event. In an example, the range between the first and second devices and/or identification values associated with the first and second devices may be provided to the contact tracing application.

Figure 15B:
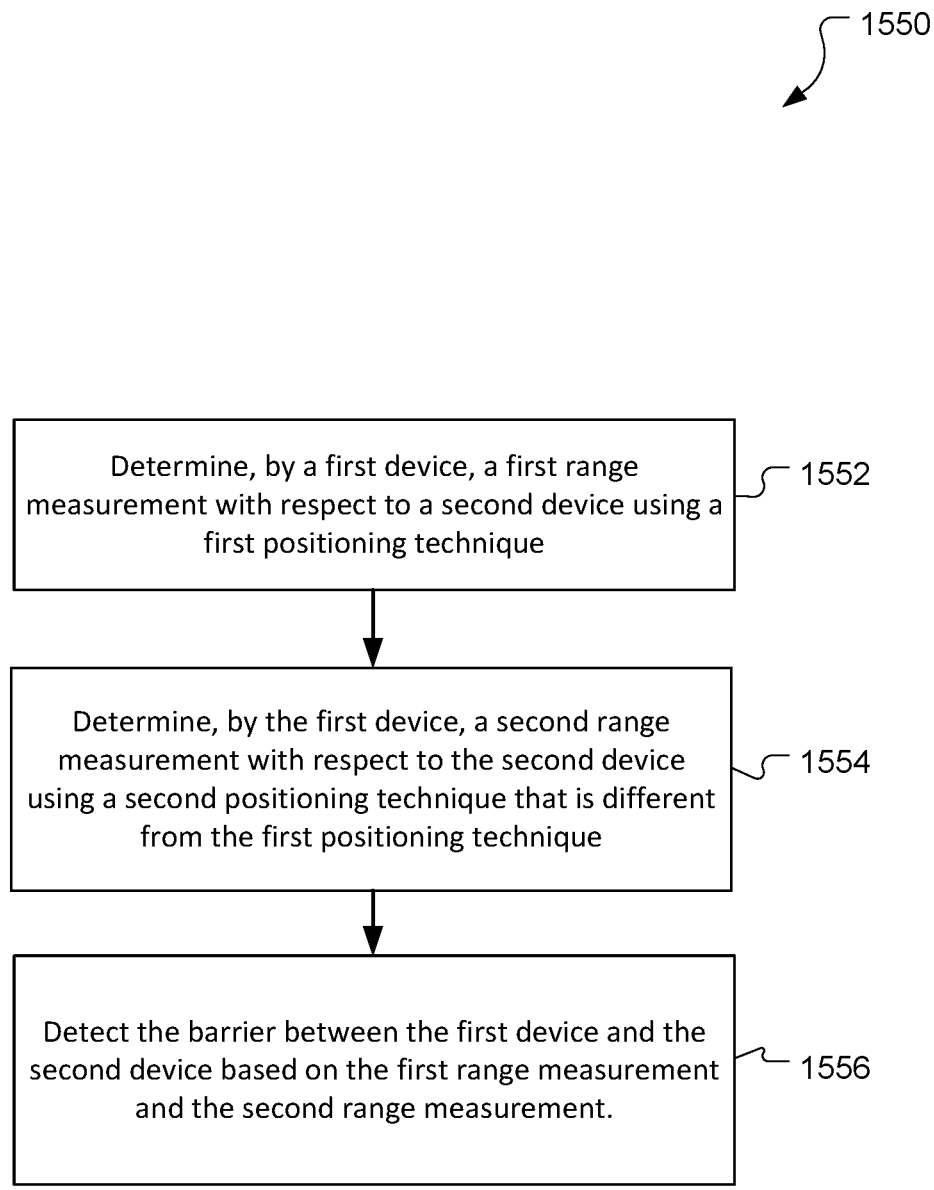
FIG. 15B is a process flow for another example method for detecting a barrier with a device.

Referring to FIG. 15B, with further reference to FIGS. 1-14, another method 1550 for detecting a barrier between a first device and a second device includes the stages shown. The method 1550 is, however, an example and not limiting. The method 1550 may be altered, e.g., by having stages added, removed, rearranged, combined, performed concurrently, and/or having single stages split into multiple stages.

At stage 1552, the method includes determining, by the first device, a first range measurement with respect to the second device using a first positioning technique. The UE 200 is a means for determining the first range. The first and second devices may include combinations mobile and stationary devices. For example, the two devices may both be mobile devices such as depicted in FIG. 6, or one of the devices may be a stationary device such as an access point, point of sale (POS) terminal, automated teller, etc. The first positioning technique may be one of RTT, RSSI, mmW measurements, and ultrasonic ranging. For example, referring to FIG. 6, the first positioning technique may be a time based range measurements such as RTT measurements or other time-of-flight positioning techniques such as TDOA and TOA/TOD. In an example, the RTT measurements may be based on an FTM exchange with the device. Other reference signals such as sidelink SRS in a 5G NR capable UE may be used for range measurements. In an embodiment, other positioning techniques such as millimeter wave ranging and ultrasonic ranging may be used to obtain range measurements. The first positioning technique may include utilizing more than one channel (i.e., multiple frequencies). The method 1500 may be initiated when the device is within a predefined contact range such as the contact range 606.

At stage 1554, the method includes determining, by the first device, a second range measurement with respect to the second device using a second positioning technique that is different from the first positioning technique. The UE 200 is a means for determining the second range measurement. The second positioning technique may be one of RTT, RSSI, mmW measurements, and ultrasonic ranging. For example, referring to FIG. 7, the second positioning technique may be a range measurement based on signal strength measurements such as a RSSI. In an embodiment, the second positioning technique may utilize multiple frequencies to obtain the range measurements. The first and second positioning techniques may utilize existing wireless technologies such as, for example, WiFi, WiFi-D, BT, Zigbee, 5G NR, side link protocols, and other D2D interfaces (e.g., PC5). In an embodiment, the first positioning technique and the second positioning technique may be based on one or more radio frequency signals communicated in accordance with a WiFi communication protocol or a Bluetooth communication protocol.

At stage 1556, the method includes detecting the barrier between the first device and the second device based on the first range measurement and the second range measurement. The UE 200 is a means for detecting a barrier. In an example, the UE 200 may include a local data structure including apriori probability values associated with the first and second range measurements. For example, the local data structure may include one or more of the tables, records and fields in the data structure 1300. The UE 200 may determine a probability value based on the range measurements and the data structure to detect the barrier, the probability value indicates the probability that the first device and the second device have a barrier between them. For example, a barrier may be detected if the probability value is above an established threshold. In an embodiment, the UE 200 may utilize one or more of a current time, a current date, and a current coarse location to query the data structure and obtain probability values. The coarse location may correspond to an environment tag associated with location such as a campus, building, floor, or other geographic area. In an embodiment, the data structure 1300 may persist on a first device and may be provided to a second device via a sidelink. In a contact tracing application, an indication of the barrier and/or the probability value may be provided to characterize the contact event. In an example, the range between the first and second devices and/or identification values associated with the first and second devices may be provided to the contact tracing application.

Figure 16:
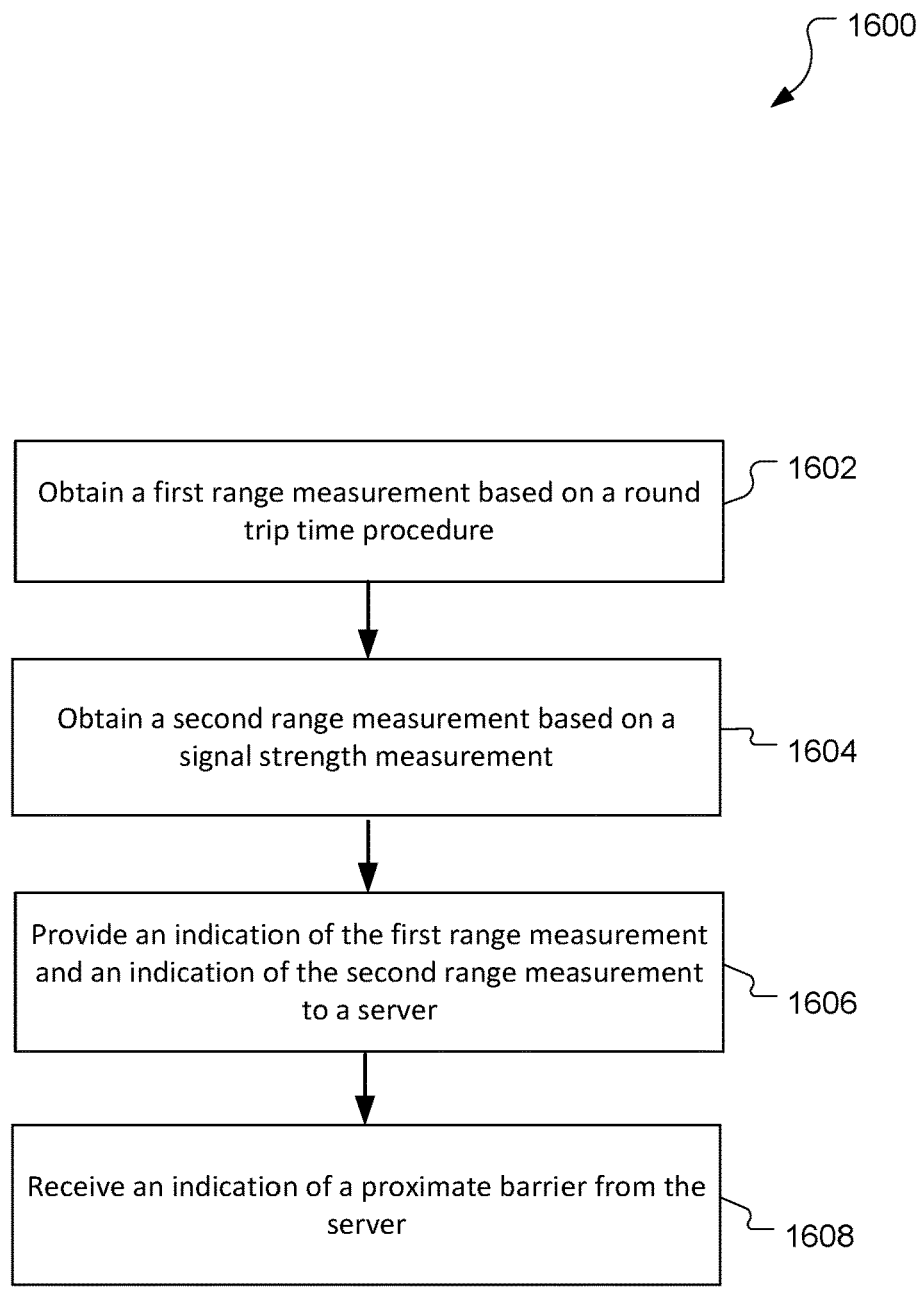
FIG. 16 is a process flow for an example method for detecting a barrier with network assistance data.

Referring to FIG. 16, with further reference to FIGS. 1-14, a method 1600 for detecting a barrier with network assistance data includes the stages shown. The method 1600 is, however, an example and not limiting. The method 1600 may be altered, e.g., by having stages added, removed, rearranged, combined, performed concurrently, and/or having single stages split into multiple stages.

At stage 1602, the method includes obtaining a first range measurement based on a round trip time procedure. The UE 200 is a means for obtaining the first range measurement. The range estimate may be based on RTT measurements or other time-of-flight positioning techniques such as TDOA and TOA/TOD. In an example, the RTT measurements may be based on an FTM exchange with the device. Other reference signals such as sidelink SRS in a 5G NR capable UE may be used. In an example, range estimates may be obtained on more than one channel (i.e., multiple frequencies).

At stage 1604, the method includes obtaining a second range measurement based on a signal strength measurement. The UE 200 is a means for obtaining the second range measurement. In an example, the received signal strength measurement may be a RSSI measurement based on RTT signals received from the device. Other RF signals may also be used to obtain the RSSI. In an embodiment, RSSI measurements may be obtained for multiple frequencies. The range estimates and the signal strength measurements may utilize existing wireless technologies such as, for example, WiFi, WiFi-D, BT, Zigbee, 5G NR, side link protocols, and other D2D interfaces (e.g., PC5).

At stage 1606, the method includes providing an indication of the first range measurement and an indication of the second range measurement to a server. The UE 200 is a means for providing the first and second indication of the measurements to the server. The UE 200 may utilize the communication system 100 to provide the indications of the measurements to a server such as the LMF 120 or an external client 150. In an example, one or both of the indications may be range values (e.g., distances) computed by a mobile device and provided to the server. In an example, one or both of the indications may be measurement values (e.g., time-of-flight information, signal strength information), and the server may be configured to determine range values based on the measurements. In an example, the crowdsourcing server 1210 may receive the measurement values and determine a barrier probability value. The server may utilize the data structure 1300 to compute the barrier probability based on the received range and received signal strength measurements. In an example, the server may utilize one or more of a current time, a current date, and a current coarse location (e.g., environment tag) of the requesting device to query the data structure 1300 and obtain probability values. In an embodiment, the data structure 1300 may be associated with a single channel or may include records based on multiple channels.

At stage 1608, the method includes receiving an indication of a proximate barrier from the server. The UE 200 is a means for receiving an indication of a proximate barrier. For example, the UE 200 may receive the indication via LPP/NPP messaging. Other messaging protocols such as radio resource control (RRC) may also be used. For example, in a V2X application, the UE 200 may receive the indication via the Uu or PC5 interfaces. In operation, the received indication of the proximate barrier may be associated with a contact tracing event record and provided to the contact tracing application. In an embodiment, the indication of a proximate barrier and a contact tracing index field may be provided to a contact tracing server directly and the contact tracing server may be configured to correlate the barrier information with the contact event.

Figure 17:
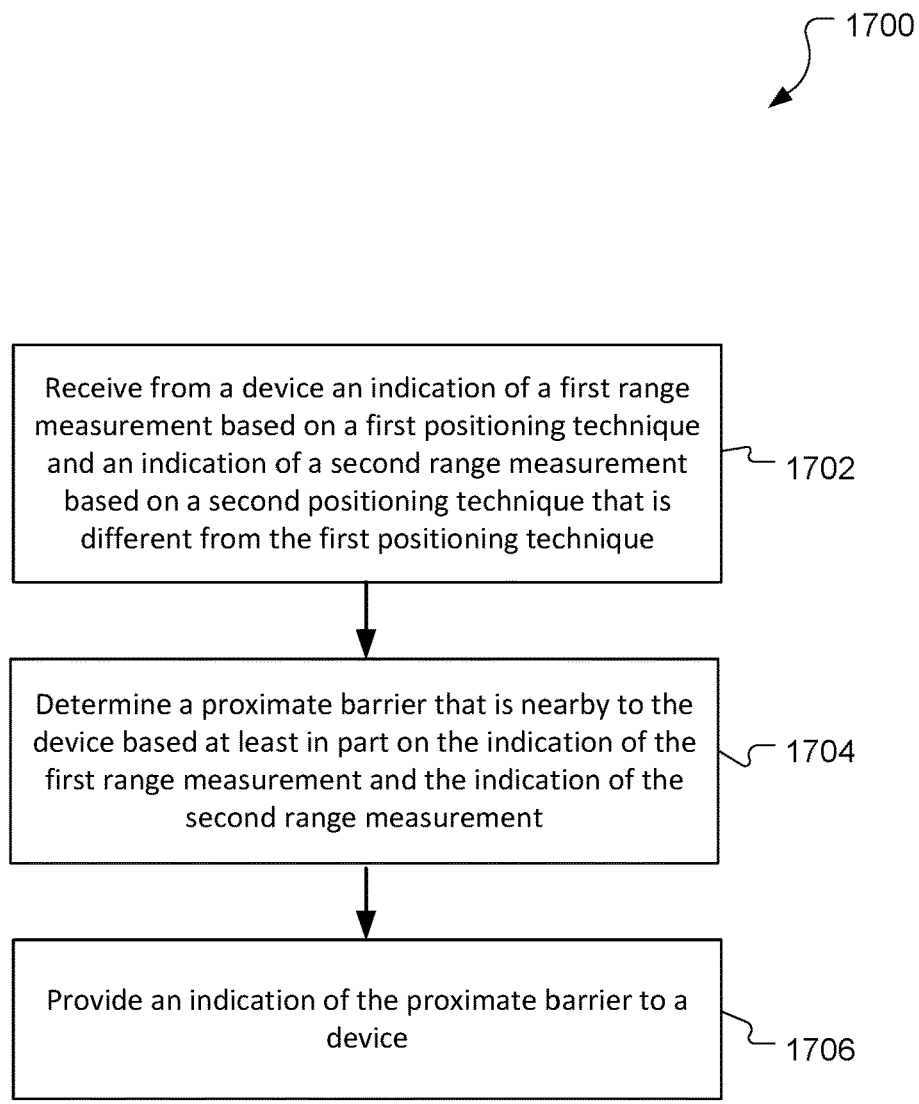
FIG. 17 is a process flow for an example method for providing barrier detection information to a device.

Referring to FIG. 17, with further reference to FIGS. 1-14, a method 1700 for providing barrier detection information to a device includes the stages shown. The method 1700 is, however, an example and not limiting. The method 1700 may be altered, e.g., by having stages added, removed, rearranged, combined, performed concurrently, and/or having single stages split into multiple stages.

At stage 1702, the method includes receiving from the device an indication of a first range measurement based on a first positioning technique and an indication of a second range measurement based on a second positioning technique that is different from the first positioning technique. The server 400 is a means for receiving the indications of the first and second range measurement. The device may be utilizing a contact tracing application and may have a potential contact event to evaluate. In an example, the first positioning technique may be based on RTT procedures or other time-of-flight positioning techniques such as TDOA and TOA/TOD between the device and another UE such as another device or a stationary device. The indication of the first range measurement may be a range value (e.g., distance) computed by the device, or the indication may be the time-of-flight information and the server may be configured to determine a range value based on the time-of-flight information. The second positioning technique may be a RSSI measurement based on RTT signals received by the device. Other RF signals may also be used to obtain the RSSI. The indication of the second range measurement by be a range value (e.g., distance) computed by the device, or the indication may be signal strength measurements (e.g., dB values) and the server may be configured to determine a range value based on the signal strength measurements. In an embodiment, a plurality of range estimates and signal strength values may be received, such that the range estimates and/or signal strength values were obtained by the device on multiple frequencies. Other ranging technologies such as millimeter wave ranging and ultrasonic ranging may also be used as the first and/or second positioning techniques.

At stage 1704, the method includes determining a proximate barrier that is nearby to the device based at least in part on the indication of the first range measurement and the indication of the second range measurement. The server 400 is a means for determining the proximate barrier. The server 400 may include a data structure such as the data structure 1300 including the apriori probability values associated with the first and second range measurements. For example, the data structure may include RTT range estimates and RSSI signal strength values. The server 400 may determine a probability value based on the first and second range estimates and the probability values in the data structure 1300 to detect the proximate barrier. For example, a proximate barrier may be detected if the probability value is above an established threshold. In an embodiment, the server 400 may utilize one or more of a current time, a current date, and a current coarse location of the requesting device to query the data structure and obtain probability values. In an example, the coarse location may correspond to an environment tag associated with a previously defined location such as campus, building, floor, or other geographic area.

At stage 1706, the method includes providing an indication of the proximate barrier to the device. The server 400 is a means for providing the indication to the device. In an example, the indication may be included in a radio resource control (RRC) message and the device may be configured to interpret the indication as the presence of a proximate barrier. Other signaling, such as LPP/NPP may also be used to provide the indication. The method 1700 may provide remote barrier detection capabilities for limited capability devices. For example, a NR-light UE may have reduced memory and processing capabilities and thus may rely on network resources to perform the data management and processing described herein. The server 400 may be configured to provide a contact tracing applications information associated with the contact event. For example, identification information associated with the device, range information and barrier information may be provided to the contact tracing application.

Figure 18:
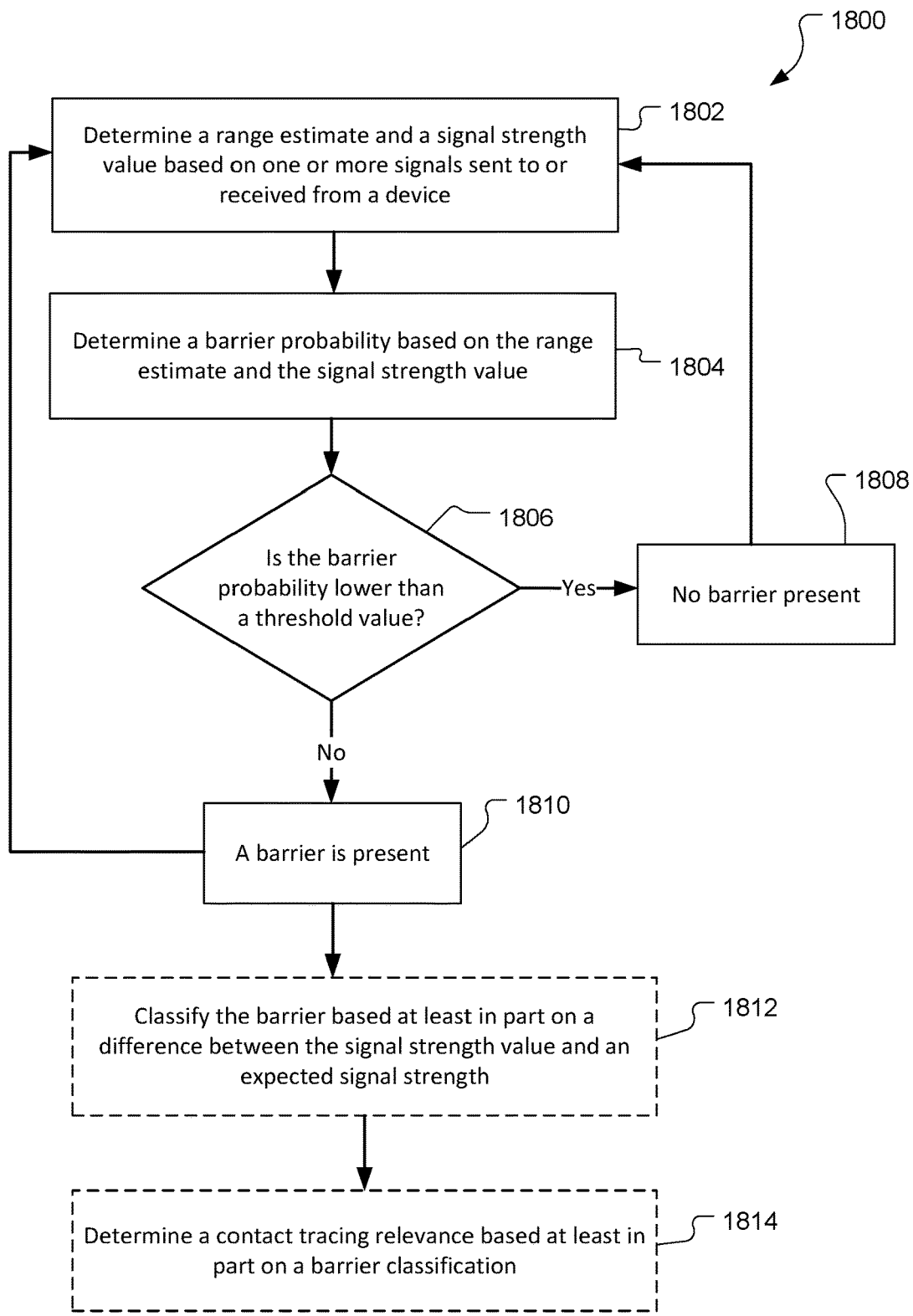
FIG. 18 is a process flow for an example method of detecting a barrier based on a probability threshold.

Referring to FIG. 18, with further reference to FIGS. 1-14, a method 1800 for detecting a barrier based on a probability threshold includes the stages shown. The method 1800 is, however, an example and not limiting. The method 1800 may be altered, e.g., by having stages added, removed, rearranged, combined, performed concurrently, and/or having single stages split into multiple stages. For example, stages 1812 and 1814 are indicated in dashed lines and are optional.

At stage 1802, the method includes determining a range estimate and signal strength value based on one or more signal sent to or received from a device. The UE 200 and server 400 are example means for determining the range estimate and signal strength value. The method 1800 may be performed locally by a UE 200 or by a network resource such as the LMF 120, the crowdsourcing server 1210, or another server 400. In an example, the range estimate may be based on RTT measurements or other time-of-flight positioning techniques between the device and another UE. The signal strength measurement may be a RSSI measurement based on RTT signals received by the device. Other RF signals may also be used to obtain the RSSI. In an embodiment, the one or more signals may include a plurality of range estimates and signal strength values obtained by the device on multiple frequencies.

At stage 1804, the method includes determining a barrier probability based on the range estimate and the signal strength value. The UE 200 and the server 400 are example means for determining the barrier probability. The UE 200 or the server 400 may include a data structure such as the data structure 1300 including the apriori probability values associated with the range estimate and the signal strength value. The UE 200 or the server 400 may determine a probability value based on the range estimate and signal strength value and the probability values in the data structure to detect the proximate barrier. In an example, date/time and/or location information (e.g., environment tags) may be used to determine the barrier probability (e.g., based on records in the data structure 1300).

At stage 1806, the method includes determining if the barrier probability is lower than a threshold value. The UE 200 and the server 400 are example means for determining if the barrier probability is lower than a threshold. In an example, the threshold value may be an established value (e.g., 70%, 80%, 85%, 90%, 95%, etc.) for a network or contact tracing application. Threshold values, however, may vary based on application requirements or other operational limitations. In an example, different frequency layers may have different threshold values. Infection rates and the communicability of a disease may impact the threshold values (i.e., a highly communicable disease may utilize a higher threshold value for barrier detection). Other application specific considerations may also be used to determine the threshold values. If the barrier probability determined at stage 1804 is lower than the threshold value, then no barrier is detected at stage 1808 and the method 1800 may iterate back to stage 1802. If the barrier probability determined at stage 1804 is greater than or equal to the threshold value, then a barrier is detected at stage 1810 and the method 1800 may iterate back to stage 1802

At stage 1812, the method may optionally include classifying the barrier based at least in part on the difference between the signal strength value and an expected signal strength. The UE 200 and the server 400 are example means for classifying the barrier. The classification of a barrier may be based on the physical composition of the barrier which may be related to an amount an RF signal is attenuated. In an embodiment, the expected signal strength may be based on propagation models and the difference between the signal strength value and the expected signal strength may be an indication of the material composition of the barrier. The attenuation at different frequencies may also be used to classify the barrier. In an example, the data structure 1300 may include a classification field associated with apriori measurement values. The classification field may be updated based on machine learning or other analysis (e.g., neural network training) of the range, signal strength and other predictive variables such as location, date and time.

At stage 1814, the method may optionally include determining a contact tracing relevance based at least in part on the barrier classification. The UE 200 and the server 400 are example means for determining the contact tracing relevance. The contact tracing relevance may be established based on properties associated with a communicable disease. For example, contact events for a highly communicable disease may be tracked for some lighter barrier classifications (e.g., light doors, windows) and not tracked for more substantial barriers (e.g., dense barrier such as concrete walls). Other relevancy decisions may be based on the nature of a pathogen and the potential interaction with the different classifications of barriers.

Figure 19:
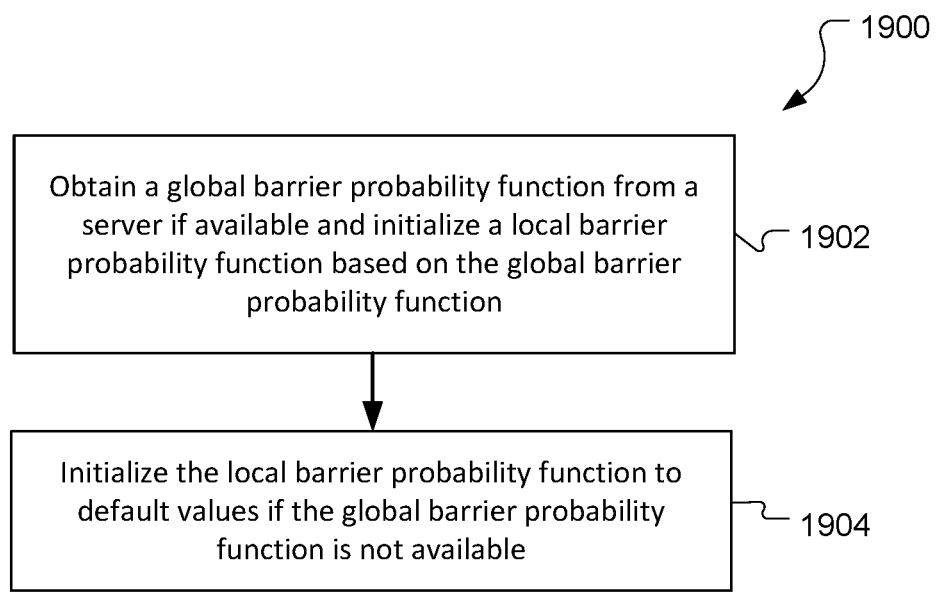
FIG. 19 is a process flow for an example method of initializing a barrier detection probability function on a device.

Referring to FIG. 19, with further reference to FIGS. 1-14, a method 1900 for initializing a barrier detection probability function on a device includes the stages shown. The method 1900 is, however, an example and not limiting. The method 1900 may be altered, e.g., by having stages added, removed, rearranged, combined, performed concurrently, and/or having single stages split into multiple stages.

At stage 1902, the method includes obtaining a global barrier probability function from a server if available and initializing a local barrier probability function based on the global barrier probability function. The UE 200 is a means for obtaining a global barrier probability function. In an embodiment, the UE 200 may query a server 400, such as the crowdsourcing server 1210, to determine a global learned model of P(Barrier) and P(d) is available. The model may be records in the data structure 1300. The UE 200 may download and initialize a device local model based on the global models received from the server. In an example, the global barrier probability function may be associated with a coarse location such as a city, campus, building, floor, or other zone which may be defined and associated with records in the data structure.

At stage 1904, the method includes initializing the local barrier probability function to default values if the global barrier probability function is not available. The UE 200 is a means for initializing a local barrier probability model. In an example, if the global model is not available at stage 1902, the UE 200 may be configured to initialize a local P(Barrier)=0.001 and P(d)=uniform distribution across all possible values of d.

Figure 20:
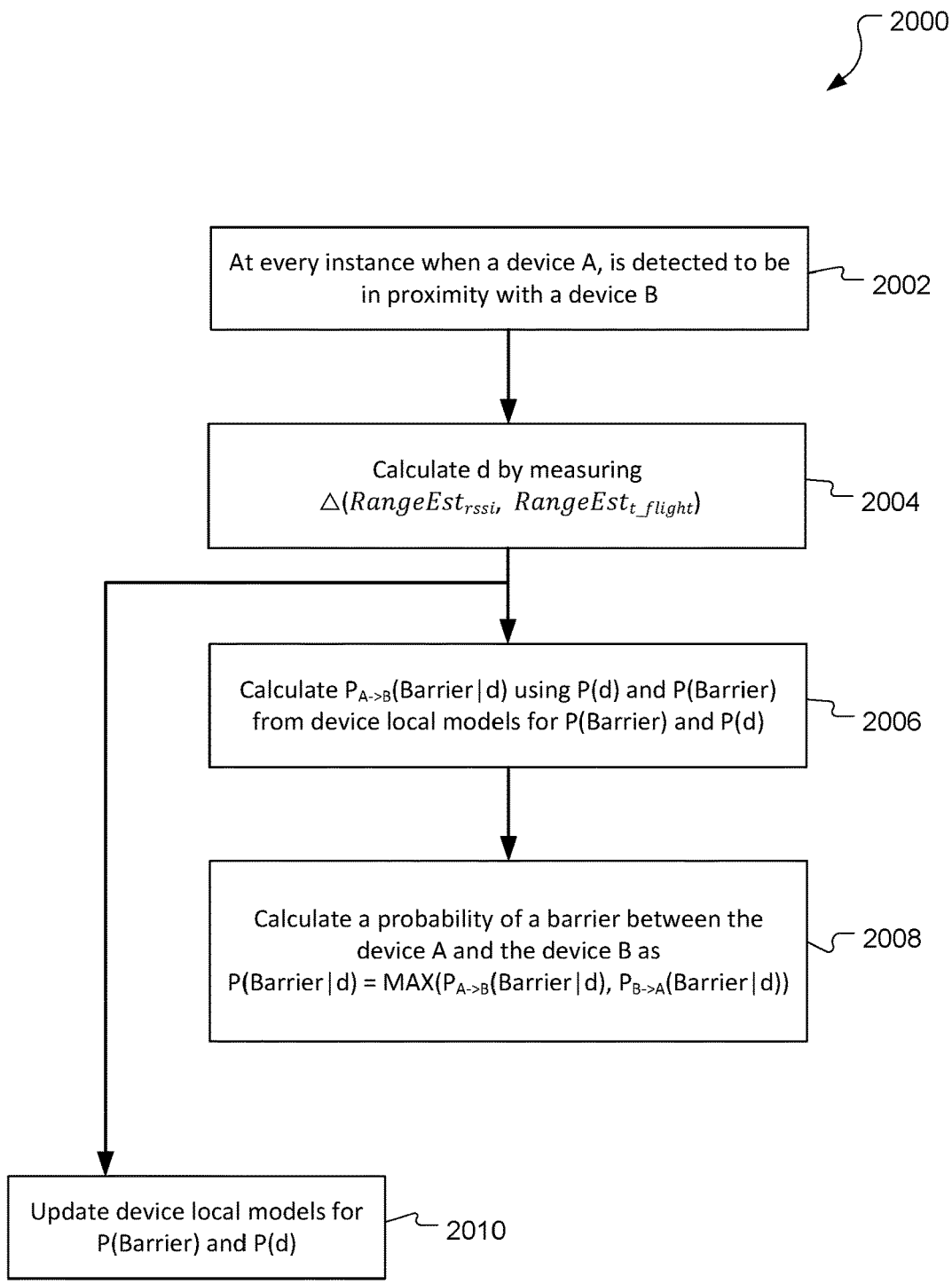
FIG. 20 is a process flow for an example method of calculating a probability of a barrier between two devices.

Referring to FIG. 20, with further reference to FIGS. 1-14, a method 2000 for calculating a probability of a barrier between two devices includes the stages shown. The method 2000 is, however, an example and not limiting. The method 2000 may be altered, e.g., by having stages added, removed, rearranged, combined, performed concurrently, and/or having single stages split into multiple stages.

At stage 2002, the method initiates when a device A, is detected to be in proximity with a device B. The UE 200 is an example of the device A or the device B. Referring to FIG. 7, the first mobile device 602 is an example of device A and the second mobile device 604 is an example of device B. The mobile devices are within an established contact range 606 which is an example of being within proximity of one another.

At stage 2004, the method includes calculating d by measuring $\Delta(\text{RangeEst}_{rssi}, \text{RangeEst}_{t\_flight})$. The UE 200 is a means for calculating d. In an example, the first mobile device 602 may perform an RTT procedure with the second mobile device 604 to determine the $\text{RangeEst}_{t\_flight}$ value. Other time-of-flight techniques such as TDOA, TOA/TOD may also be used. The first mobile device 602 may also determine a RSSI measurement on the RF signals 710 to determine the $\text{RangeEst}_{rssi}$ value. The UE 200 may be configured to update the device local models for the P(Barrier) and P(d) values at stage 2010.

At stage 2006, the method includes calculating $P_{A \to B}$(Barrier|d) using P(d) and P(Barrier) from device local models for P(Barrier) and P(d). The UE 200 is a means for calculating $P_{A \to B}$(Barrier|d). In an example, the $P_{A \to B}$(Barrier|d) value may be calculated based on equation 3.

At stage 2008, the method includes calculating a probability of a barrier between the device A and the device B as P(Barrier|d)=MAX($P_{A \to B}$(Barrier|d), $P_{B \to A}$(Barrier|d)). The UE 200 is a means for calculating the probability of a barrier. In an example, both the first mobile device 602 and the second mobile device 604 may be configured to calculate a probability of a barrier and provide their respective probability results to one another. Since the two mobile devices 602, 604 may have asymmetric values for P(Barrier|d) due to these self-learned models, the two mobile devices 602, 604 may estimate different values for P(Barrier|d), even if both the devices estimate the same value of d. The asymmetry may be resolved by calculating MAX($P_{A \to B}$(Barrier|d), $P_{B \to A}$(Barrier|d)).

Figure 21A:
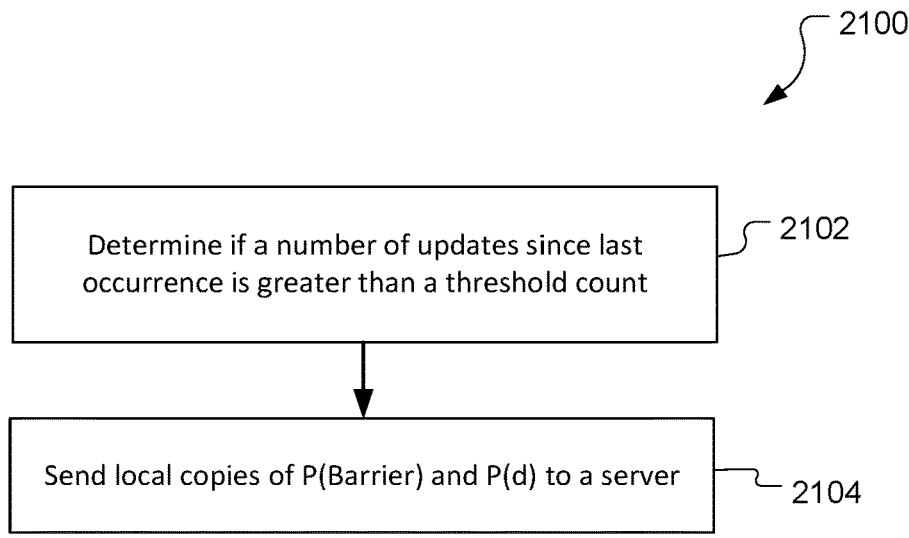
FIG. 21A is a process flow for an example method of periodically uploading barrier detection models to a crowdsourcing server.

Referring to FIG. 21A, with further reference to FIGS. 1-14, a method 2100 for periodically uploading barrier detection models to a crowdsourcing server includes the stages shown. The method 2100 is, however, an example and not limiting. The method 2100 may be altered, e.g., by having stages added, removed, rearranged, combined, performed concurrently, and/or having single stages split into multiple stages.

At stage 2102, the method includes determining if a number of updates since last occurrence is greater than a threshold count. The UE 200 is a means for determining the number of updates. A threshold value may be established for a network or subsets of the network. For example, the threshold value may be based on a frequency layer, a coarse location, a number of users, or other technical criteria. Operational requirements, such as the communicability of a disease and the corresponding contact tracing requirements may determine the threshold value. The threshold value may be based on 5, 10, 20, 50, 100, etc. updates. Other values may also be used.

At stage 2104, the method includes sending local copies of P(Barrier) and P(d) to a server. The UE 200 is a means for sending the local copies. The server may be the LMF 120, or other network server 400 such as the crowdsourcing server 1210. The UE 200 may utilize the communication system 100 to provide the P(Barrier) and P(d) values to the server. In an example, the UE 200 may utilize RRC, LPP or other interfaces to update the server. Other signaling protocols such as WiFi and BT may also be used to send the updates.

Figure 21B:
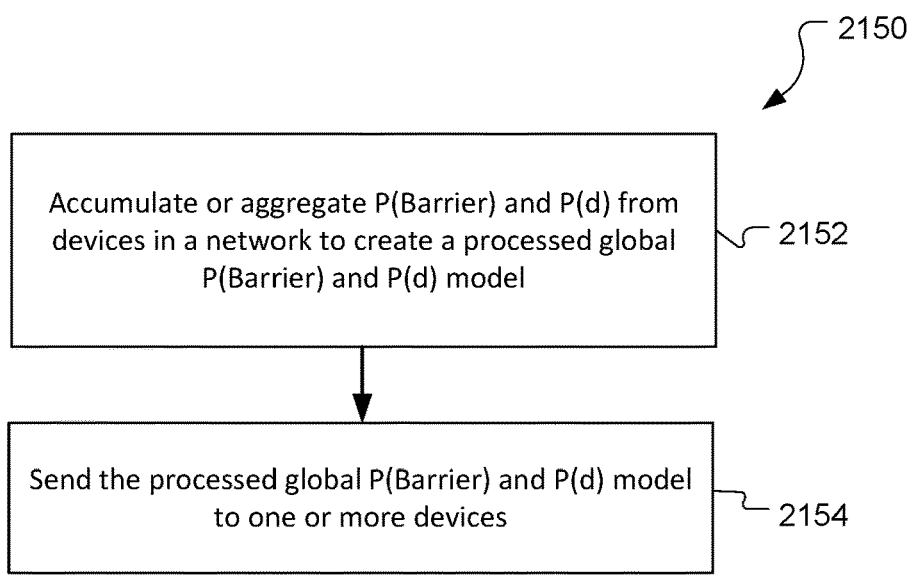
FIG. 21B is a process flow for an example method of providing barrier detection models to devices.

Referring to FIG. 21B, with further reference to FIGS. 1-14, a method 2150 for providing barrier detection models to devices includes the stages shown. The method 2150 is, however, an example and not limiting. The method 2150 may be altered, e.g., by having stages added, removed, rearranged, combined, performed concurrently, and/or having single stages split into multiple stages.

At stage 2152, the method includes accumulating or aggregating P(Barrier) and P(d) from devices in a network to create a processed global P(Barrier) and P(d) model. The server 400 is a means for accumulating P(Barrier) and P(d) from devices in a network to create an processed global P(Barrier) and P(d) model. The crowdsourcing server 1210 may receive the local copies of P(Barrier) and P(d) sent at stage 2104 in the method 2100 and average the results received from a plurality of devices. In an example, the processed global P(Barrier) and P(d) models may be obtained by various statistical and logical operations and may be quantized based on other factors such as coarse location, and time and date information. Other operational and technical factors may also be used to determine processed values.

At stage 2154, the method includes sending the processed global P(Barrier) and P(d) model to one or more devices. The server 400 is a means for sending the processed models. In an example, the crowdsourcing server 1210 may utilize the communication system 100 to send the global models. The global models may be sent in response to a request from a UE (e.g., a pull implementation) and/or on a periodic bases (e.g., a push implementation). The models may be provided to the UEs in one or more system information blocks (SIBs), RRC messages, LPP, or other signaling mechanism. In an embodiment, the UEs may utilize a sidelink protocol to propagate the global models to proximate UEs. Other data dissemination techniques may also be used to provide the global P(Barrier) and P(d) models to UEs in a network.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

1. A method for detecting a barrier between a first device and a second device, comprising:
   determining, by the first device, a first range measurement with respect to the second device using a first positioning technique;
   determining, by the first device, a second range measurement with respect to the second device using a second positioning technique that is different from the first positioning technique; and
   detecting the barrier between the first device and the second device based on the first range measurement and the second range measurement.

2. The method of clause 1 wherein the first positioning technique is based on a round trip time measurement between the first device and the second device.

3. The method of clause 2 wherein the round trip time measurement is based on an exchange of fine timing measurements between the first device and the second device.

4. The method of clause 1 wherein the second positioning technique is based on a received signal strength indication measurement.

5. The method of clause 1 wherein the first positioning technique is based on one or more millimeter wave signals transmitted from the first device.

6. The method of clause 1 wherein the first positioning technique is based on one or more ultrasonic signals transmitted from the first device.

7. The method of clause 1 further comprising determining that the first device is within a predefined contact range of the second device.

8. The method of clause 1 further comprising providing an indication of the barrier to a contact tracing application.

9. The method of clause 8 further comprising providing a range between the first device and the second device to the contact tracing application.

10. The method of clause 8 further comprising providing a first identification value associated with the first device and a second identification value associated with the second device to the contact tracing application.

11. The method of clause 1 further comprising receiving a probability model from a server.

12. The method of clause 1 wherein detecting the barrier comprises providing the first range measurement and the second range measurement to a server.

13. The method of clause 12 wherein detecting the barrier comprises receiving an indication of the barrier between the first device and the second device from the server.

14. The method of clause 12 wherein the server is a crowdsourcing server configured to receive range measurement information, barrier detection information, and location information from a plurality of devices in a network.

15. The method of clause 1 wherein detecting the barrier is performed by the first device.

16. The method of clause 1 wherein at least one of the first positioning technique and the second positioning technique is based on one or more radio frequency signals communicated in accordance with a WiFi communication protocol or a Bluetooth communication protocol.

17. The method of clause 1 wherein at least one of the first positioning technique and the second positioning technique is based on one or more radio frequency signals communicated in accordance with a new radio sidelink protocol.

18. The method of clause 1 further comprising determining a coarse location of the first device, wherein detecting the barrier is based at least in part on the coarse location.

19. The method of clause 18 wherein the coarse location is associated with an environment tag.

20. The method of clause 1 further comprising determining date and time information, wherein detecting the barrier is based at least in part on the date and time information.

21. The method of clause 1 wherein the first device is a mobile or stationary device and the second device is a mobile or stationary device.

22. The method of clause 1 wherein the barrier is an architectural feature designed to separate spaces.

23. The method of clause 1 wherein the barrier is a safety device designed to separate people and reduce a free communication of an airborne disease.

24. The method of clause 1 wherein the barrier is a group of objects such that a density of the group of objects impedes a spread of an airborne disease.

25. A method for providing barrier detection information to a device, comprising:
   receiving from the device an indication of a first range measurement based on a first positioning technique and an indication of a second range measurement based on a second positioning technique that is different from the first positioning technique;
   determining a proximate barrier based at least in part on the indication of the first range measurement and the indication of the second range measurement; and
   providing an indication of the proximate barrier to the device.

26. The method of clause 25 wherein the first positioning technique is based on a round trip time measurement and the second positioning technique is based on a received signal strength indication measurement.

27. The method of clause 25 wherein the first positioning technique is based on one or more millimeter wave signals transmitted from the device.

28. The method of clause 25 wherein the first positioning technique is based on one or more ultrasonic signals transmitted from the device.

29. The method of clause 25 wherein determining the proximate barrier includes querying a data structure based on the indication of the first range measurement and the indication of the second range measurement.

30. The method of clause 25 further comprising determining a coarse location of the device, and determining the proximate barrier is based at least in part on the coarse location of the device.

31. The method of clause 30 wherein the coarse location is associated with an environment tag.

32. The method of clause 25 further comprising determining date and time information, and determining the proximate barrier is based at least in part on the date and time information.

33. The method of clause 25 further comprising providing the indication of the proximate barrier to a contact tracing application.

34. The method of clause 33 further comprising providing at least one of the indication of the first range measurement and the indication of the second range measurement to the contact tracing application.

35. The method of clause 33 further comprising providing an identification value associated with the device to the contact tracing application.

36. The method of clause 33 further comprising providing barrier classification information to the contact tracing application.

37. The method of clause 25 wherein the indication of the first range measurement includes a range value.

38. The method of clause 25 wherein the indication of the first range measurement includes a time-of-flight value.

39. The method of clause 25 wherein the indication of the second range measurement includes a range value.

40. The method of clause 25 wherein the indication of the second range measurement includes a signal strength value.

41. An apparatus, comprising:
a memory;
at least one transceiver;
at least one processor communicatively coupled to the memory and the at least one transceiver and configured to:
determine a first range measurement with respect to a user equipment using a first positioning technique;
determine a second range measurement with respect to the user equipment using a second positioning technique that is different from the first positioning technique; and
detect a barrier between the apparatus and the user equipment based on the first range measurement and the second range measurement.

42. The apparatus of clause 41 wherein the first positioning technique is based on a round trip time measurement between the apparatus and the user equipment, and the at least one processor is further configured to determine the round trip time measurement between the apparatus and the user equipment.

43. The apparatus of clause 42 wherein the round trip time measurement is based on an exchange of fine timing measurements between the apparatus and the user equipment.

44. The apparatus of clause 41 wherein the second positioning technique is based on a received signal strength indication measurement, and the at least one processor is further configured to determine the received signal strength indication measurement.

45. The apparatus of clause 41 wherein the first positioning technique is based on one or more millimeter wave signals transmitted from the apparatus, and the at least one processor is further configured to determine the first range measurement based on the one or more millimeter wave signals transmitted from the apparatus.

46. The apparatus of clause 41 wherein the first positioning technique is based on one or more ultrasonic signals transmitted from the apparatus, and the at least one processor is further configured to determine the first range measurement based on the one or more ultrasonic signals transmitted from the apparatus.

47. The apparatus of clause 41 wherein the at least one processor is further configured to determine that the apparatus is within a predefined contact range of the user equipment.

48. The apparatus of clause 41 wherein the at least one processor is further configured to provide an indication of the barrier to a contact tracing application.

49. The apparatus of clause 48 wherein the at least one processor is further configured to provide a range between the apparatus and the user equipment to the contact tracing application.

50. The apparatus of clause 48 wherein the at least one processor is further configured to provide a first identification value associated with the apparatus and a second identification value associated with the user equipment to the contact tracing application.

51. The apparatus of clause 41 wherein the at least one processor is further configured to receive a probability model from a server.

52. The apparatus of clause 41 wherein the at least one processor is configured to provide the first range measurement and the second range measurement to a server and receive the indication of the barrier between the apparatus and the user equipment from the server.

53. The apparatus of clause 41 wherein the at least one processor is further configured to provide the first range measurement, the second range measurement, barrier detection information, and location information to a crowdsourcing server.

54. The apparatus of clause 41 wherein at least one of the first positioning technique and the second positioning technique is based on one or more radio frequency signals communicated in accordance with a WiFI communication protocol or a Bluetooth communication protocol.

55. The apparatus of clause 41 wherein at least one of the first positioning technique and the second positioning technique is based on one or more radio frequency signals communicated in accordance with a new radio sidelink protocol.

56. The apparatus of clause 41 wherein the at least one processor is further configured to determine a coarse location and detect the barrier based at least in part on the coarse location.

57. The apparatus of clause 56 wherein the coarse location is associated with an environment tag.

58. The apparatus of clause 41 wherein the at least one processor is further configured to determine date and time information and detect the barrier based at least in part on the date and time information.

59. The apparatus of clause 41 wherein the apparatus is mobile or stationary and the user equipment is mobile or stationary.

60. An apparatus, comprising:
a memory;
at least one transceiver;
at least one processor communicatively coupled to the memory and the at least one transceiver and configured to:
receive an indication of a first range measurement based on a first positioning technique and an indication of a second range measurement based on a second positioning technique that is different from the first positioning technique;
determine a proximate barrier based at least in part on the indication of the first range measurement and the indication of the second range measurement; and
provide an indication of a proximate barrier to a device.

61. The apparatus of clause 60 wherein the first positioning technique is based on a round trip time measurement and the second positioning technique is based on a received signal strength indication measurement.

62. The apparatus of clause 60 wherein the first positioning technique is based on one or more millimeter wave signals transmitted from the device.

63. The apparatus of clause 60 wherein the first positioning technique is based on one or more ultrasonic signals transmitted from the device.

64. The apparatus of clause 60 wherein the at least one processor is further configured to query a data structure based on the indication of the first range measurement and the indication of the second range measurement.

65. The apparatus of clause 60 wherein the at least one processor is further configured to determine a coarse location of the device, and determine the proximate barrier based at least in part on the coarse location of the device.

66. The apparatus of clause 65 wherein the coarse location is associated with an environment tag.

67. The apparatus of clause 60 wherein the at least one processor is further configured to determine date and time information, and determine the proximate barrier based at least in part on the date and time information.

68. The apparatus of clause 60 wherein the at least one processor is further configured to provide the indication of the proximate barrier to a contact tracing application.

69. The apparatus of clause 68 wherein the at least one processor is further configured to provide at least one of the indication of the first range measurement and the indication of the second range measurement to the contact tracing application.

70. The apparatus of clause 68 wherein the at least one processor is further configured to provide an identification value associated with the device to the contact tracing application.

71. The apparatus of clause 68 wherein the at least one processor is further configured to provide barrier classification information to the contact tracing application.

72. The apparatus of clause 68 wherein the at least one processor is further configured to provide a duration of a contact event to the contact tracing application.

73. The apparatus of clause 60 wherein the indication of the first range measurement includes a range value.

74. The apparatus of clause 60 wherein the indication of the first range measurement includes a time-of-flight value.

75. The apparatus of clause 60 wherein the indication of the second range measurement includes a range value.

76. The apparatus of clause 60 wherein the indication of the second range measurement includes a signal strength value.

77. An apparatus, comprising:
a memory;
at least one transceiver;
at least one processor communicatively coupled to the memory and the at least one transceiver and configured to:
determine a first distance between the apparatus and a user equipment using a first positioning technique;
determine a second distance between the apparatus and the user equipment using a second positioning technique that is different from the first positioning technique; and
detect the barrier between the apparatus and the user equipment based on a difference between the first distance and the second distance.

78. An apparatus for detecting a barrier, comprising:
means for determining a first range measurement with respect to a user equipment using a first positioning technique;
means for determining a second range measurement with respect to the user equipment using a second positioning technique that is different from the first positioning technique; and
means for detecting the barrier based on the first range measurement and the second range measurement.

79. An apparatus for providing barrier detection information to a device, comprising:
means for receiving an indication of a first range measurement based on a first positioning technique and an indication of a second range measurement based on a second positioning technique that is different from the first positioning technique;
means for determining a proximate barrier based at least in part on the indication of the first range measurement and the indication of the second range measurement; and
means for providing an indication of a proximate barrier to the device.

80. An apparatus for detecting a barrier, comprising:
means for determining a first distance between the apparatus and a user equipment using a first positioning technique;
means for determining a second distance between the apparatus and the user equipment using a second positioning technique that is different from the first positioning technique; and
means for detecting the barrier between the apparatus and the user equipment based on a difference between the first distance and the second distance.

81. A non-transitory processor-readable storage medium comprising processor-readable instructions configured to cause one or more processors to detect a barrier, comprising:
code for determining a first range measurement with respect to a user equipment using a first positioning technique;
code for determining a second range measurement with respect to the user equipment using a second positioning technique that is different from the first positioning technique; and
code for detecting the barrier based on the first range measurement and the second range measurement.

82. A non-transitory processor-readable storage medium comprising processor-readable instructions configured to cause one or more processors to provide barrier detection information to a device, comprising:
code for receiving an indication of a first range measurement based on a first positioning technique and an indication of a second range measurement based on a second positioning technique that is different from the first positioning technique;
code for determining a proximate barrier based at least in part on the indication of the first range measurement and the indication of the second range measurement; and
code for providing an indication of a proximate barrier to the device.

83. A non-transitory processor-readable storage medium comprising processor-readable instructions configured to cause one or more processors to detect a barrier, comprising:
code for determining, by a first device, a first distance between the first device and a second device using a first positioning technique;
code for determining, by the first device, a second distance between the first device and the second device using a second positioning technique that is different from the first positioning technique; and
code for detecting the barrier between the first device and the second device based on a difference between the first distance and the second distance.

84. A method for detecting a barrier, comprising:
- determining, by a first device, a first distance between the first device and a second device using a first positioning technique;
- determining, by the first device, a second distance between the first device and the second device using a second positioning technique that is different from the first positioning technique; and
- detecting the barrier between the first device and the second device based on a difference between the first distance and the second distance.

85. A method for detecting a barrier with network assistance data, comprising:
- obtaining a first range measurement based on a round trip time procedure;
- obtaining a second range measurement based on a signal strength measurement;
- providing an indication of the first range measurement and an indication of the second range measurement to a server; and
- receiving an indication of a proximate barrier from the server.

86. The method of clause 85 wherein the indication of the first range measurement includes a distance value.

87. The method of clause 85 wherein the indication of the first range measurement includes a time-of-flight value.

88. The method of clause 85 wherein the indication of the second range measurement includes a distance value.

89. The method of clause 85 wherein the indication of the second range measurement includes a signal strength value.

90. An apparatus, comprising:
- a memory;
- at least one transceiver;
- at least one processor communicatively coupled to the memory and the at least one transceiver and configured to:
  - obtain a first range measurement based on a round trip time procedure;
  - obtain a second range measurement based on a signal strength measurement;
  - provide an indication of the first range measurement and an indication of the second range measurement to a server; and
  - receive an indication of a proximate barrier from the server.

91. The apparatus of clause 90 wherein the indication of the first range measurement includes a distance value.

92. The apparatus of clause 90 wherein the indication of the first range measurement includes a time-of-flight value.

93. The apparatus of clause 90 wherein the indication of the second range measurement includes a distance value.

94. The apparatus of clause 90 wherein the indication of the second range measurement includes a signal strength value.

95. An apparatus for detecting a barrier with network assistance data, comprising:
- means for obtaining a first range measurement based on a round trip time procedure;
- means for obtaining a second range measurement based on a signal strength measurement;
- means for providing an indication of the first range measurement and an indication of the second range measurement to a server; and
- means for receiving an indication of a proximate barrier from the server.

96. A non-transitory processor-readable storage medium comprising processor-readable instructions configured to cause one or more processors to detect a barrier using network assistance data, comprising:
- code for obtaining a first range measurement based on a round trip time procedure;
- code for obtaining a second range measurement based on a signal strength measurement;
- code for providing an indication of the first range measurement and an indication of the second range measurement to a server; and
- code for receiving an indication of a proximate barrier from the server.

The invention claimed is:

1. A method for providing barrier detection information to a device, comprising:
- receiving from the device an indication of a first range measurement based on a first positioning technique and an indication of a second range measurement based on a second positioning technique that is different from the first positioning technique;
- determining a proximate barrier based at least in part on the indication of the first range measurement, the indication of the second range measurement, and a barrier probability based on a correlation of ranges and corresponding range measurements, wherein the ranges are based on the first positioning technique and the range measurements are based on the second positioning technique; and
- providing an indication of the proximate barrier to the device.

2. The method of claim 1 wherein the first positioning technique is based on a round trip time measurement and the second positioning technique is based on a received signal strength indication measurement.

3. The method of claim 1 wherein the first positioning technique is based on one or more millimeter wave signals transmitted from the device.

4. The method of claim 1 wherein the first positioning technique is based on one or more ultrasonic signals transmitted from the device.

5. The method of claim 1 wherein determining the proximate barrier includes querying a data structure based on the indication of the first range measurement and the indication of the second range measurement.

6. The method of claim 1 further comprising determining a coarse location of the device, and determining the proximate barrier is based at least in part on the coarse location of the device.

7. The method of claim 6 wherein the coarse location is associated with an environment tag.

8. The method of claim 1 further comprising determining date and time information, and determining the proximate barrier is based at least in part on the date and time information.

9. The method of claim 1 further comprising providing the indication of the proximate barrier to a contact tracing application.

10. The method of claim 9 further comprising providing at least one of the indication of the first range measurement and the indication of the second range measurement to the contact tracing application.

11. The method of claim 9 further comprising providing an identification value associated with the device to the contact tracing application.

12. The method of claim 9 further comprising providing barrier classification information to the contact tracing application.

13. The method of claim 1 wherein the indication of the first range measurement includes a range value.

14. The method of claim 1 wherein the indication of the first range measurement includes a time-of-flight value.

15. The method of claim 1 wherein the indication of the second range measurement includes a range value.

16. The method of claim 1 wherein the indication of the second range measurement includes a signal strength value.

17. An apparatus, comprising:
a memory;
at least one transceiver;
at least one processor communicatively coupled to the memory and the at least one transceiver and configured to:
receive an indication of a first range measurement based on a first positioning technique and an indication of a second range measurement based on a second positioning technique that is different from the first positioning technique;
determine a proximate barrier based at least in part on the indication of the first range measurement, the indication of the second range measurement, and a barrier probability based on a correlation of ranges and corresponding range measurements, wherein the ranges are based on the first positioning technique and the range measurements are based on the second positioning technique; and
provide an indication of a proximate barrier to a device.

18. The apparatus of claim 17 wherein the first positioning technique is based on a round trip time measurement and the second positioning technique is based on a received signal strength indication measurement.

19. The apparatus of claim 17 wherein the first positioning technique is based on one or more millimeter wave signals transmitted from the device.

20. The apparatus of claim 17 wherein the first positioning technique is based on one or more ultrasonic signals transmitted from the device.

21. The apparatus of claim 17 wherein the at least one processor is further configured to query a data structure based on the indication of the first range measurement and the indication of the second range measurement.

22. The apparatus of claim 17 wherein the at least one processor is further configured to determine a coarse location of the device, and determine the proximate barrier based at least in part on the coarse location of the device.

23. The apparatus of claim 22 wherein the coarse location is associated with an environment tag.

24. The apparatus of claim 17 wherein the at least one processor is further configured to determine date and time information, and determine the proximate barrier based at least in part on the date and time information.

25. The apparatus of claim 17 wherein the at least one processor is further configured to provide the indication of the proximate barrier to a contact tracing application.

26. The apparatus of claim 25 wherein the at least one processor is further configured to provide at least one of the indication of the first range measurement and the indication of the second range measurement to the contact tracing application.

27. The apparatus of claim 25 wherein the at least one processor is further configured to provide an identification value associated with the device to the contact tracing application.

28. The apparatus of claim 25 wherein the at least one processor is further configured to provide barrier classification information to the contact tracing application.

29. The apparatus of claim 25 wherein the at least one processor is further configured to provide a duration of a contact event to the contact tracing application.

30. The apparatus of claim 17 wherein the indication of the first range measurement includes a range value.

31. The apparatus of claim 17 wherein the indication of the first range measurement includes a time-of-flight value.

32. The apparatus of claim 17 wherein the indication of the second range measurement includes a range value.

33. The apparatus of claim 17 wherein the indication of the second range measurement includes a signal strength value.

34. An apparatus for providing barrier detection information to a device, comprising:
means for receiving an indication of a first range measurement based on a first positioning technique and an indication of a second range measurement based on a second positioning technique that is different from the first positioning technique;
means for determining a proximate barrier based at least in part on the indication of the first range measurement, the indication of the second range measurement, and a barrier probability based on a correlation of ranges and corresponding range measurements, wherein the ranges are based on the first positioning technique and the range measurements based on the second positioning technique; and
means for providing an indication of a proximate barrier to the device.

35. A non-transitory processor-readable storage medium comprising processor-readable instructions configured to cause one or more processors to provide barrier detection information to a device, comprising:
code for receiving an indication of a first range measurement based on a first positioning technique and an indication of a second range measurement based on a second positioning technique that is different from the first positioning technique;
code for determining a proximate barrier based at least in part on the indication of the first range measurement, the indication of the second range measurement, and a barrier probability based on a correlation of ranges and corresponding range measurements, wherein the ranges are based on the first positioning technique and the range measurements are based on the second positioning technique; and
code for providing an indication of a proximate barrier to the device.

36. A method for detecting a barrier with network assistance data, comprising:
obtaining a first range measurement based on a round trip time procedure;
obtaining a second range measurement based on a signal strength measurement;
providing an indication of the first range measurement and an indication of the second range measurement to a server; and
receiving an indication of a proximate barrier from the server, the proximate barrier being based at least in part on the indication of the first range measurement, the indication of the second range measurement, and a barrier probability based on a correlation of ranges and corresponding ranges measurements, wherein the ranges are based on the round trip time procedure and the range measurements are based on the signal strength measurement.

37. The method of claim 36 wherein the indication of the first range measurement includes a distance value.

38. The method of claim 36 wherein the indication of the first range measurement includes a time-of-flight value.

39. The method of claim 36 wherein the indication of the second range measurement includes a distance value.

40. The method of claim 36 wherein the indication of the second range measurement includes a signal strength value.

41. An apparatus, comprising:
a memory;
at least one transceiver;
at least one processor communicatively coupled to the memory and the at least one transceiver and configured to:
obtain a first range measurement based on a round trip time procedure;
obtain a second range measurement based on a signal strength measurement;
provide an indication of the first range measurement and an indication of the second range measurement to a server; and
receive an indication of a proximate barrier from the server, the proximate barrier being based at least in part on the indication of the first range measurement, the indication of the second range measurement, and a barrier probability based on a correlation of ranges and corresponding range measurements, wherein the ranges are based on the round trip time procedure and the range measurements are based on the signal strength measurement.

42. The apparatus of claim 41 wherein the indication of the first range measurement includes a distance value.

43. The apparatus of claim 41 wherein the indication of the first range measurement includes a time-of-flight value.

44. The apparatus of claim 41 wherein the indication of the second range measurement includes a distance value.

45. The apparatus of claim 41 wherein the indication of the second range measurement includes a signal strength value.

46. An apparatus for detecting a barrier with network assistance data, comprising:
means for obtaining a first range measurement based on a round trip time procedure;
means for obtaining a second range measurement based on a signal strength measurement;
means for providing an indication of the first range measurement and an indication of the second range measurement to a server; and
means for receiving an indication of a proximate barrier from the server, the proximate barrier being based at least in part on the indication of the first range measurement, the indication of the second range measurement, and a barrier probability based on a correlation of ranges and corresponding range measurements, wherein the ranges are based on the round trip time procedure and the range measurements are based on the signal strength measurement.

47. A non-transitory processor-readable storage medium comprising processor-readable instructions configured to cause one or more processors to detect a barrier using network assistance data, comprising:
code for obtaining a first range measurement based on a round trip time procedure;
code for obtaining a second range measurement based on a signal strength measurement;
code for providing an indication of the first range measurement and an indication of the second range measurement to a server; and
code for receiving an indication of a proximate barrier from the server, the proximate barrier being based at least in part on the indication of the first range measurement, the indication of the second range measurement, and a barrier probability based on a correlation of ranges and corresponding range measurements, wherein the ranges are based on the round trip time procedure and the range measurements are based on the signal strength measurement.

* * * * *